United States Patent
Vieira Borges et al.

(10) Patent No.: US 11,808,115 B2
(45) Date of Patent: Nov. 7, 2023

(54) MODULAR SUBSEA EQUIPMENT, SUBSEA DISTRIBUTION EQUIPMENT, SUBSEA DISTRIBUTION EQUIPMENT ASSEMBLY AND REPAIR

(71) Applicant: FMC TECHNOLOGIES DO BRASIL LTDA, Rio de Janeiro (BR)

(72) Inventors: Gustavo Antonio Vieira Borges, Rio de Janeiro (BR); Fábio Vergara Ferreira, Rio de Janeiro (BR)

(73) Assignee: FMC TECHNOLOGIES DO BRASIL LTDA, Rio de Janeiro (BR)

( * ) Notice: Subject to any disclaimer, the term of this patent is extended or adjusted under 35 U.S.C. 154(b) by 446 days.

(21) Appl. No.: 17/055,919

(22) PCT Filed: May 14, 2019

(86) PCT No.: PCT/BR2019/050178
§ 371 (c)(1),
(2) Date: Nov. 16, 2020

(87) PCT Pub. No.: WO2019/218040
PCT Pub. Date: Nov. 21, 2019

(65) Prior Publication Data
US 2021/0207456 A1  Jul. 8, 2021

(30) Foreign Application Priority Data
May 16, 2018 (BR) .................. BR 102018009962-0

(51) Int. Cl.
*E21B 43/01* (2006.01)
*E21B 43/013* (2006.01)
*E21B 33/035* (2006.01)

(52) U.S. Cl.
CPC .......... *E21B 43/013* (2013.01); *E21B 33/035* (2013.01)

(58) Field of Classification Search
CPC ..... E21B 43/013; E21B 41/0007; E21B 43/01
See application file for complete search history.

(56) References Cited

U.S. PATENT DOCUMENTS

| 4,574,830 A | 3/1986 | Rickey et al. |
| 9,206,652 B2 * | 12/2015 | Bastesen ............. E21B 41/0007 |
| 2014/0193205 A1 | 7/2014 | Parsinejad et al. |

FOREIGN PATENT DOCUMENTS

EP    3276123 A1    1/2018

OTHER PUBLICATIONS

International Search Report issued in International Application No. PCT/BR2019/050178, dated Sep. 9, 2019 (2 pages).
(Continued)

*Primary Examiner* — Sean D Andrish
(74) *Attorney, Agent, or Firm* — Osha Bergman Watanabe & Burton LLP

(57) ABSTRACT

A subsea distribution equipment assembly includes a modular structure with a block having a metallic structure and panels that allow the configuration for several pieces of equipment, in such a way that both the hydraulic instrumentation and the electrical instrumentation are also modularized. A method of assembly a subsea distribution equipment assembly includes transporting a first block and a second block using a crane of a vessel, aligning and connecting eye joints installed on each of the first and second blocks, connecting a foundation to the first and second blocks using the crane and a trolley, and installing an umbilical termination assembly jumper between the first and second blocks.

7 Claims, 35 Drawing Sheets

(56) References Cited

OTHER PUBLICATIONS

Witten Opinion issued in International Application No. PCT/BR2019/050178, dated Sep. 9, 2019 (3 pages).

\* cited by examiner

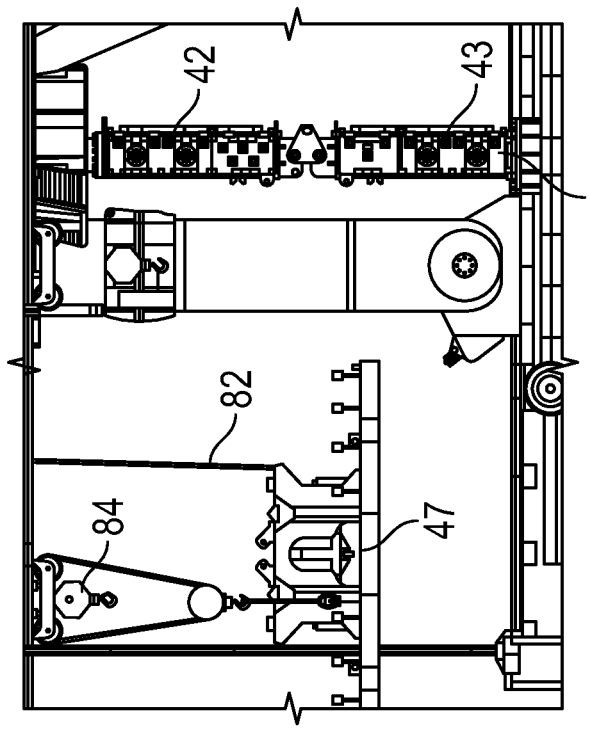
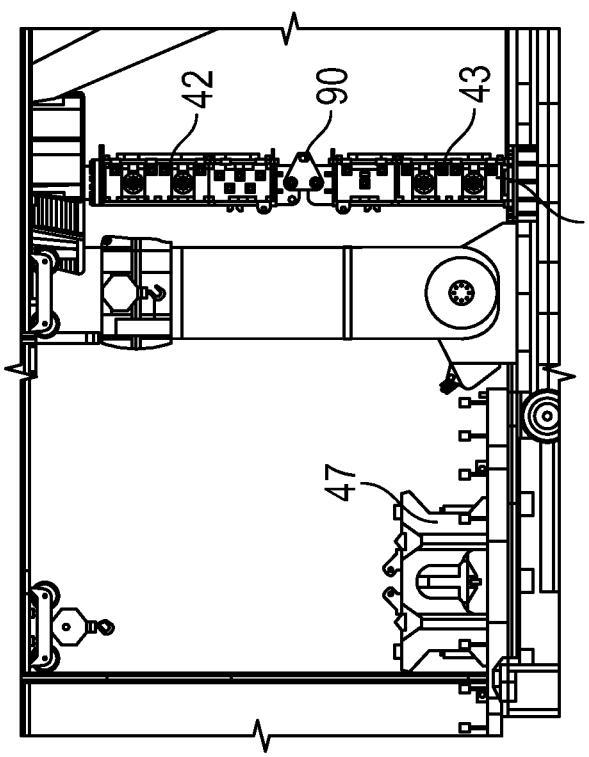
FIG. 32B
FIG. 32A

MODULAR SUBSEA EQUIPMENT, SUBSEA DISTRIBUTION EQUIPMENT, SUBSEA DISTRIBUTION EQUIPMENT ASSEMBLY AND REPAIR

FIELD OF THE INVENTION

The present invention deals with a modularization of subsea system equipment for connecting lines with more than one umbilical that are used for the control, production and injection of chemicals in the well. In addition, the present invention also deals with the assembly, installation and recovery of said equipment.

BACKGROUND OF THE INVENTION

A Subsea Distribution Equipment—Subsea Distribution Assembly (SDA) (01), illustrated by FIG. 1, is a subsea equipment responsible for the distribution of electro-hydraulic functions coming from the platform for controlling and monitoring subsea equipment, such as manifolds, Christmas trees, pumps and, consequently, controlling and monitoring oil wells. SDA (01) also directs the fluid flow in production flowlines, pig loops, control systems and flow meters.

In order to illustrate the subsea system using the SDA (01), FIG. 2 illustrates an example of a subsea operation, wherein the SDAs (01) are connected to a topside (A); Christmas trees (B) and manifold (C); and wherein the referred SDAs (01) are connected to subsea equipment through electrical and/or hydraulic jumpers (D).

Subsea Distribution Equipment can be classified as a hydraulic system and/or electrical control. The hydraulic system comprises low hydraulic flow rate control, medium hydraulic flow rate control, high hydraulic flow rate control, chemical injection, and lift and mixed gas injection. The electrical control comprises high voltage control, low voltage control, optical control and mixed control (Electrical Flying Lead+Steal Flying Lead). Both the hydraulic and electrical control systems have a similar structure.

As can be seen in FIG. 3, a typical SDA design has a main base of metallic structure that comprises a structure composed of a funnel, stab—guide and foundation (09), this main base supports the umbilical termination units (SUT) (02), hydraulic jumpers (SDAJ) (03) and Steel Flying Lead (SFL) (04, 08), hydraulic unit (HDU) (06), electrical units (EDU) (07), mixed units (SDU) (not shown), electrical connectors, optical connectors, hydraulic connectors (MQCs and Couplers), logic caps (LC) (05) and electrical jumpers (EFL).

SDA (01) includes many parts, modules, a great amount of tubbings and welds, therefore presenting different hydraulic and electrical schemes for each project. In addition, the weight of the state-of-the-art SDA (01) is around 28 tons, and the SDA (01) has large sizes, which increases the difficulty of the manufacturing processes, e.g., the welds must be qualified. The large size and weight of the SDA (01) further render transport and installation on the seabed complicated. In addition, the hydraulic and electrical schemes are specific to each SDA project (01).

The present invention deals with the modularization of the structure, hydraulic instrumentation and electrical instrumentation in blocks (10) in order to reduce the manufacturing time, size and weight of the SDA. Moreover, the present invention provides an optimization of the assembly, installation and an increase in the efficiency of subsea oil production systems.

BRIEF DESCRIPTION OF THE INVENTION

The present invention deals with the modularization of the SDA components, wherein the present invention provides a block (10) comprising a metallic structure (11), wherein said structure presents an area for the installation of panels (13) in all its extension. At a first end, the block (10) has a panel (16) with a hole (15), wherein this hole (15) will receive the umbilical cable, at its second end, the block (10) comprises a section that will connect to a second block (10). The present invention further provides the modularization of hydraulic instrumentation and electrical control. The modularization of the hydraulic instrumentation of the present invention comprises a pipe mat (19) composed of parallel tubes (20), wherein said parallel tubes (20) have connectors (21), according to the desired application in a subsea system, said pipe mat (19) being able to receive distribution module pipes. The electrical control of the present invention comprises boxes with electrical connections, known as QUADS, wherein said QUADS comprises junction boxes, electrical connectors (32) and Field Assembled Cable Termination (FACTs) (131).

The modularization of these three components, structure, hydraulic instrumentation and electrical control disclosed by the present invention allows its application in subsea control and distribution equipment. Among the embodiments of the present invention, two subsea distribution equipment (40) and (50) will be disclosed, wherein the distribution equipment (40) comprises a connection with an eye joint (49) between two blocks (10), and the distribution equipment (50) comprises a flange gasket (56) between two blocks (10). The present invention also deals with the assembly of subsea distribution equipment (40) and (50) on the deck of a vessel (80), as well as the installation of said subsea distribution equipment (40) and (50) on seabed, and the recovery and reinstallation of subsea distribution equipment (40).

DESCRIPTION OF THE FIGURES

The present invention can be well understood from the accompanying illustrative figures, which in a schematic and non-limiting way of the invention represent:

FIGS. 30-34—Assembly sequence of the SDA in line with eye joint according to the present invention;

DETAILED DESCRIPTION OF THE INVENTION

Figure 4:
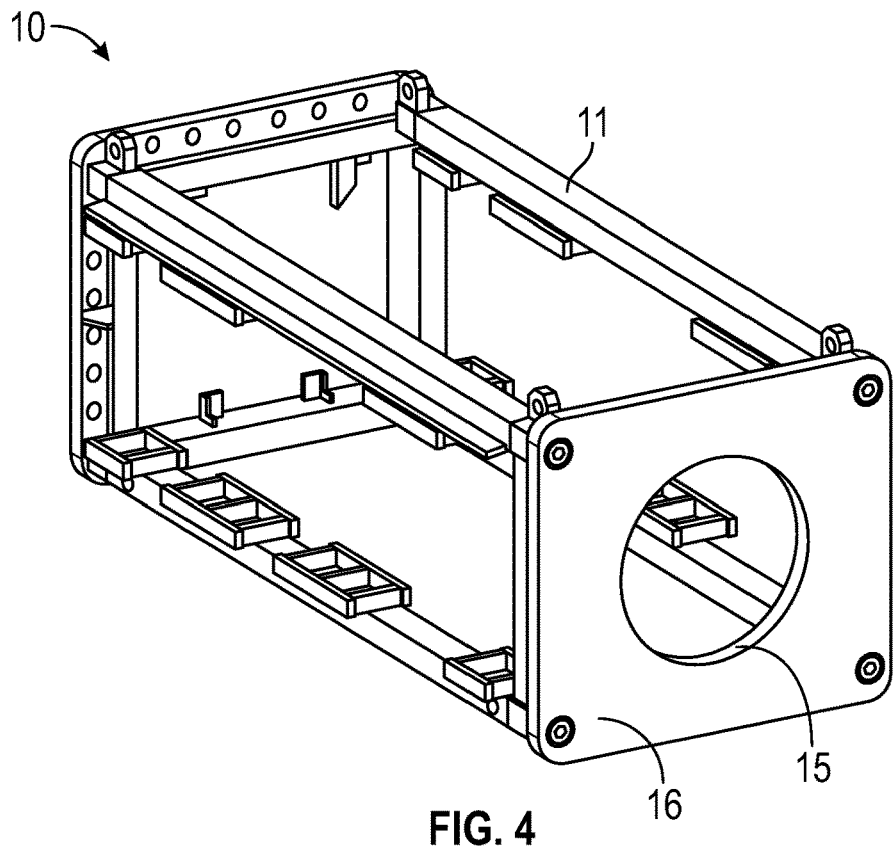
FIG. 4—Perspective view of the structure of the present invention.

As can be seen in FIG. 4, the present invention deals with the modularization of the structure, hydraulic instrumentation and electrical instrumentation of an SDA, in blocks, as well as the assembly, installation and recovery of the modules.

Structure

Figure 5:
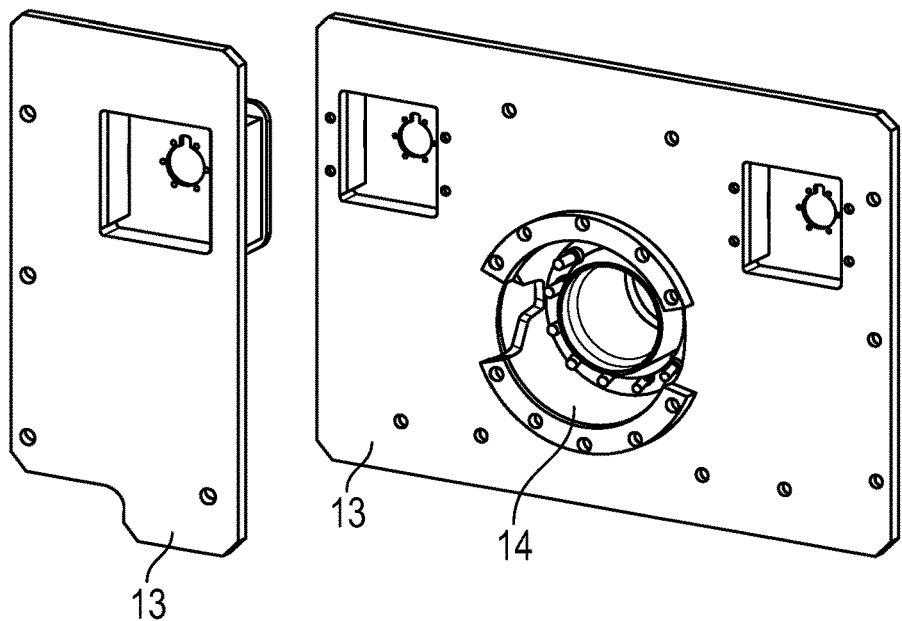
FIG. 5—Perspective view of the panel and the MQC of the present invention.

As can be seen in FIG. 4, block (10) comprises a metallic structure (11), wherein the metallic structure (11) serves as a structure for the installation of panels (13), illustrated by FIG. 5, around the surface thereof; the structure (11) further comprising a panel (16) located at its end, wherein said panel (16) has a hole (15) for the umbilical connector to be installed.

Still referring to FIG. 5, the panel (13) may have or not a hole for the installation of multi-quick connectors (14) or not have any hole, serving only to seal the inside of the structure (11), therefore, the panel format (13) varies according to the type of electro-hydraulic function and the control logic required for each field of production or injection of oil and gas.

Figure 6:
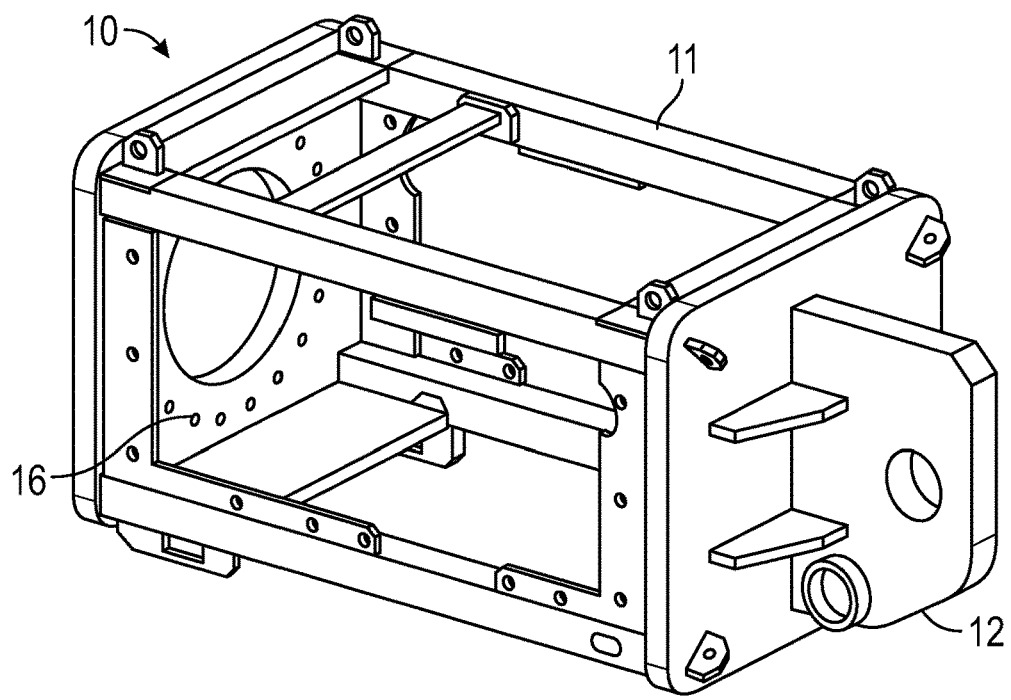
FIG. 6—Perspective view of the block used by SDA in line with the eye joint of the present invention.

In a first embodiment of the structure (11), as can be seen in FIG. 6, the structure (11) presents at the end opposite the end having the hole (15), a panel with an eye (12).

Figure 7:
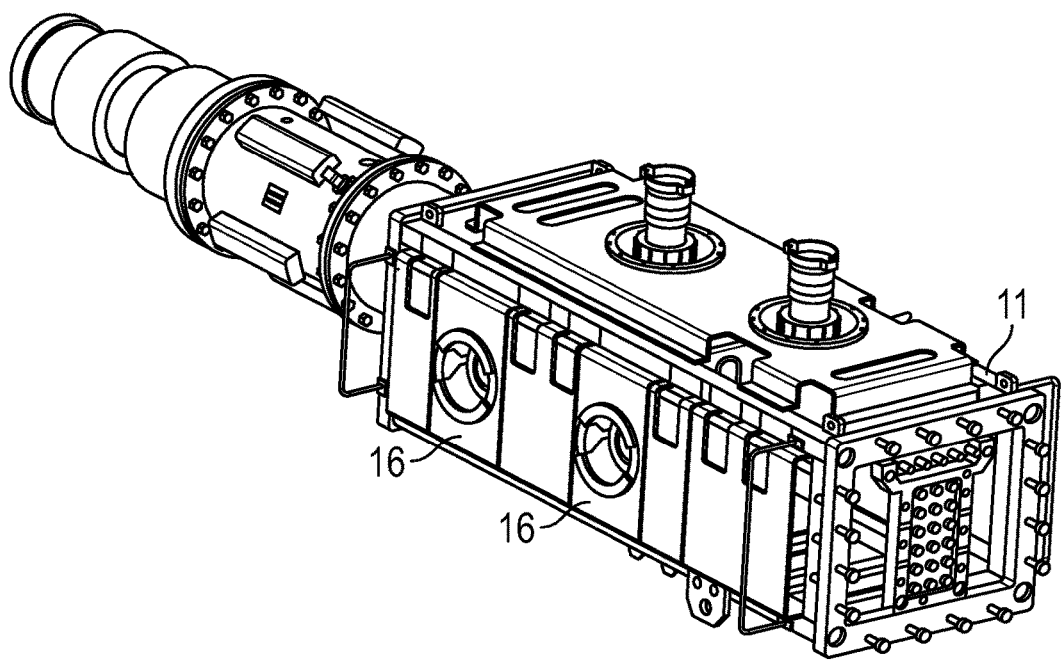
FIG. 7—Perspective view of the block used by SDA in line with the flange gasket of the present invention.

In a second embodiment, illustrated by FIG. 7 of the present invention, the structure (11) has panels (16) along its length, both on the side and on the upper portion and lower portion, the side panels having holes (16) for the installation of MQC (14) and, on the upper portion, there are also holes for the installation of MQC (14).

It is important to note that the panel format (13) varies according to the type of electro-hydraulic function and the control logic required for each field of production or injection of oil and gas.

It is noted that the block (10) allows several configurations, given the possibility of installing specific panels according to the needs of the subsea equipment design.

Hydraulic Instrumentation

Figure 8:
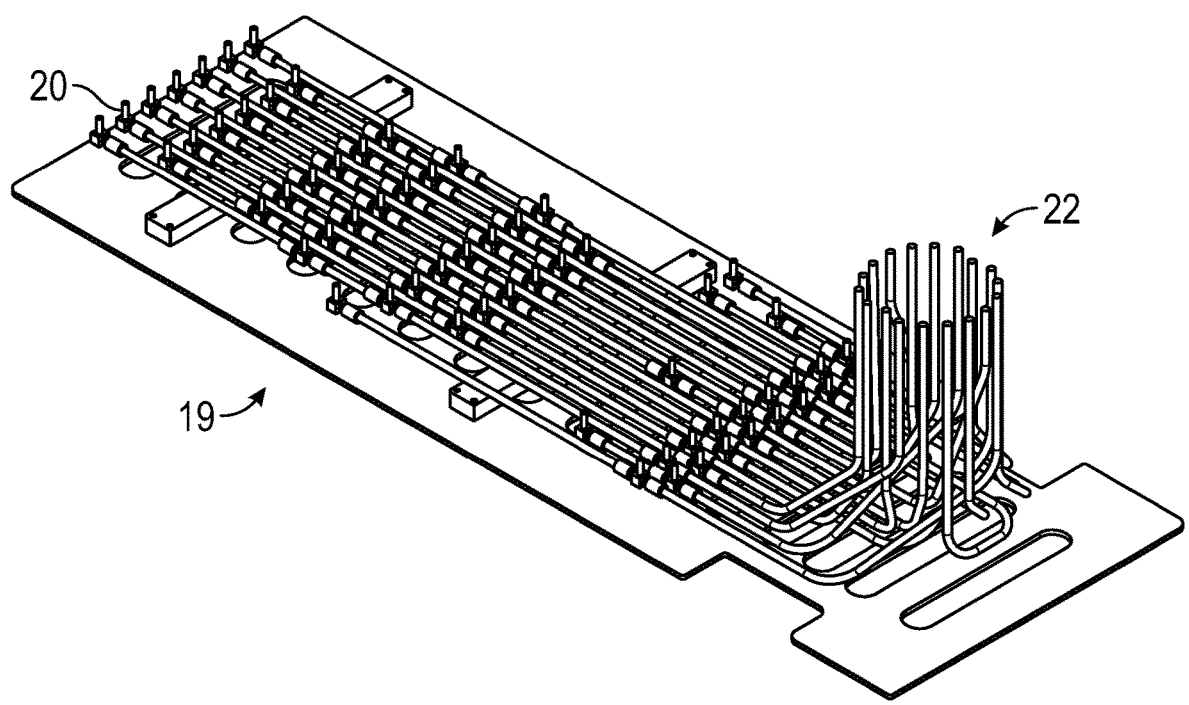
FIG. 8-16—Assembly sequence using the hydraulic modularization of the present invention.
Figure 9:
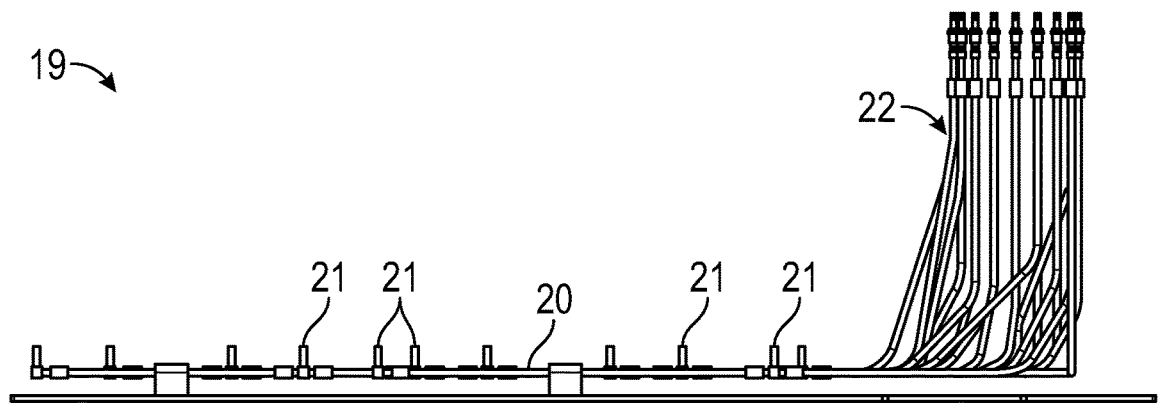

As previously mentioned, the present invention also comprises the modularization of hydraulic instrumentation, said hydraulic instrumentation, illustrated by FIGS. 8 and 9, being formed by a first layer, which is a pipe mat (19), wherein the said pipe mat (19) is located inside the structure (11). The pipe mat (19) comprises parallel tubes (20), wherein said parallel tubes (20) are composed of connectors (21) along their extension. The connectors (21) allow the installation of multi-quick connectors (MQC) (14), wherein said MQCs (14), as previously mentioned, are located on the panels (13). As can be observed, pipes for an UTAJ (22) are located at the end of the mat (19).

Figure 10:
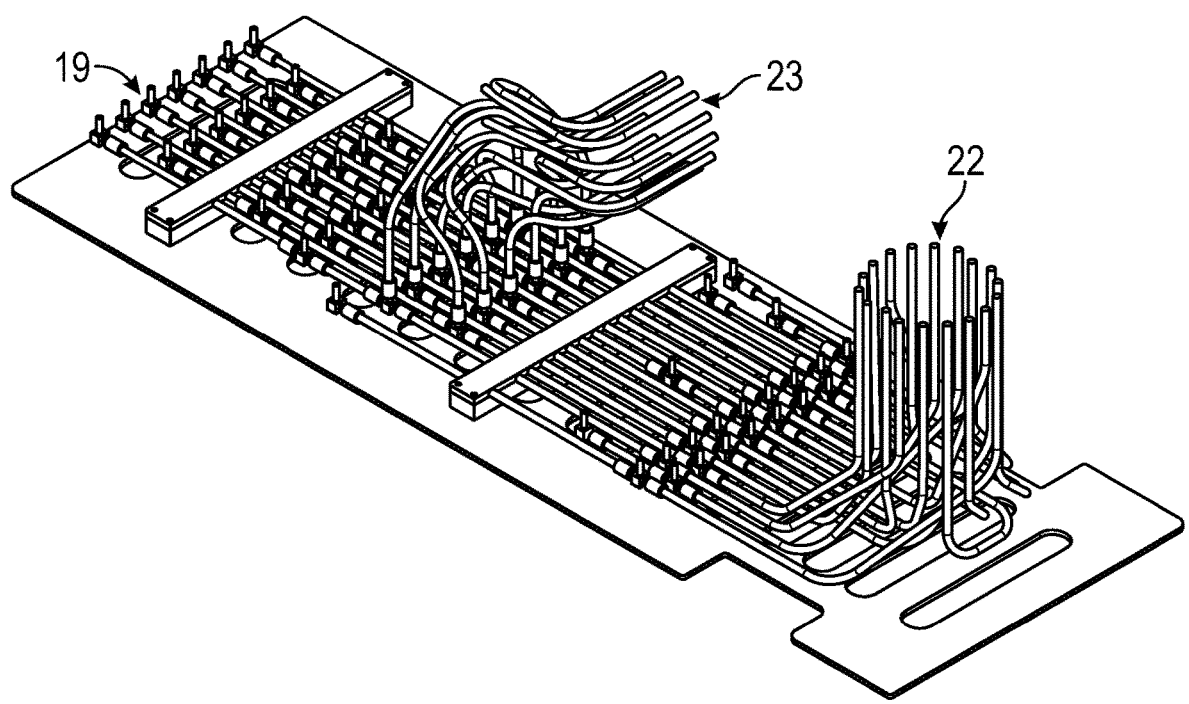

Next, the sequence of a hydraulic configuration according to the present invention will be illustrated, wherein FIGS. 8-16 illustrate the assembly sequence of a hydraulic configuration. FIGS. 8 and 9 illustrate the first layer comprising the pipe mat (19) and the UTAJ (22). FIG. 10 illustrates the installation of the pipes of a MQC distribution module (23), wherein said MQC distribution module (23) is connected to the connectors (21) of the pipe mat (19). The MQC distribution module (23) can be connected to a Christmas tree, for example.

Figure 11:
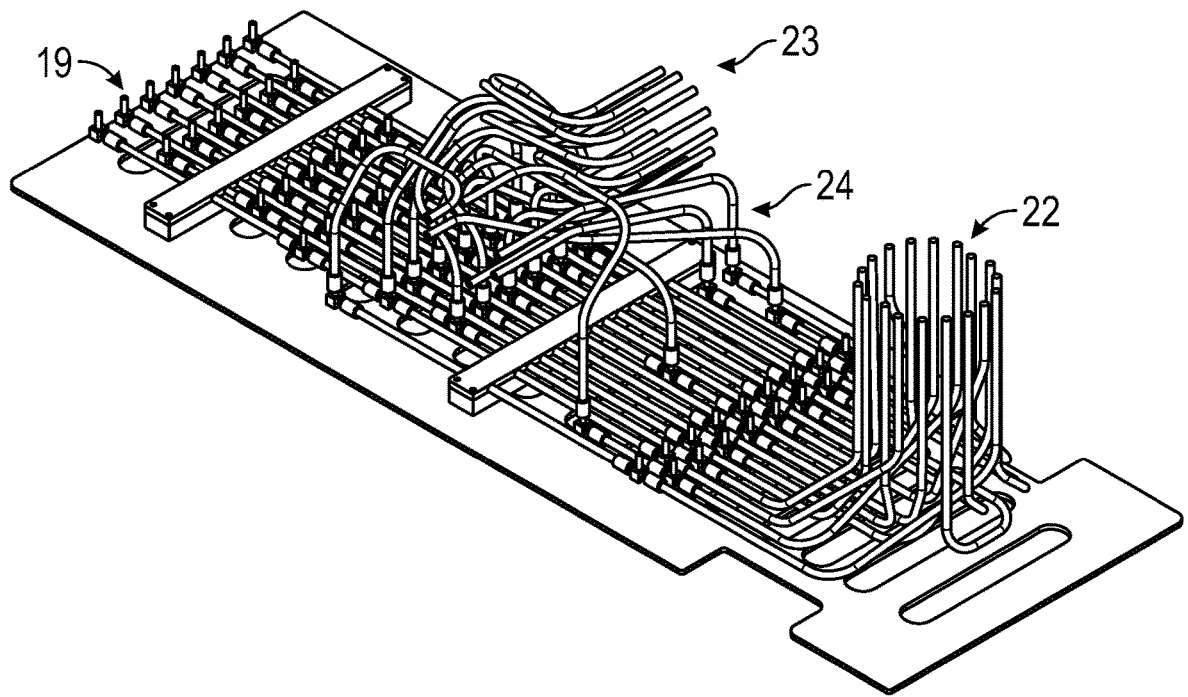
Figure 12:
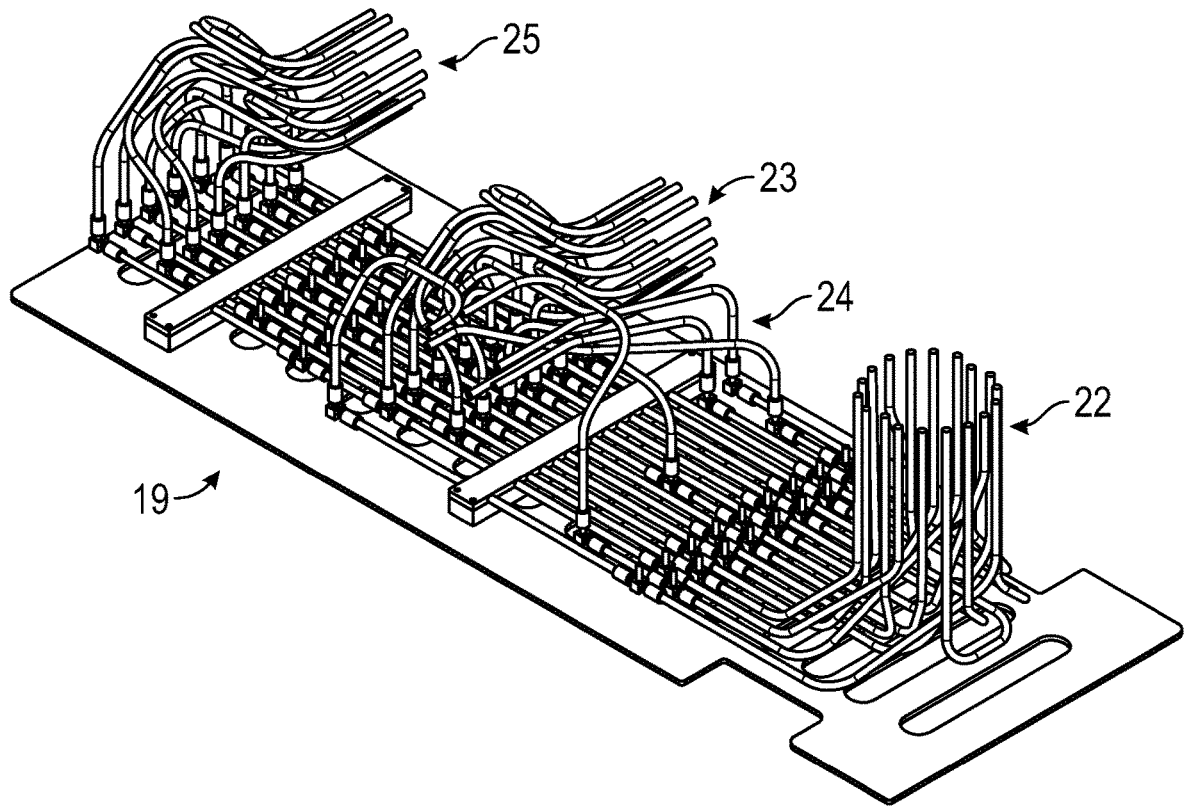
Figure 13:
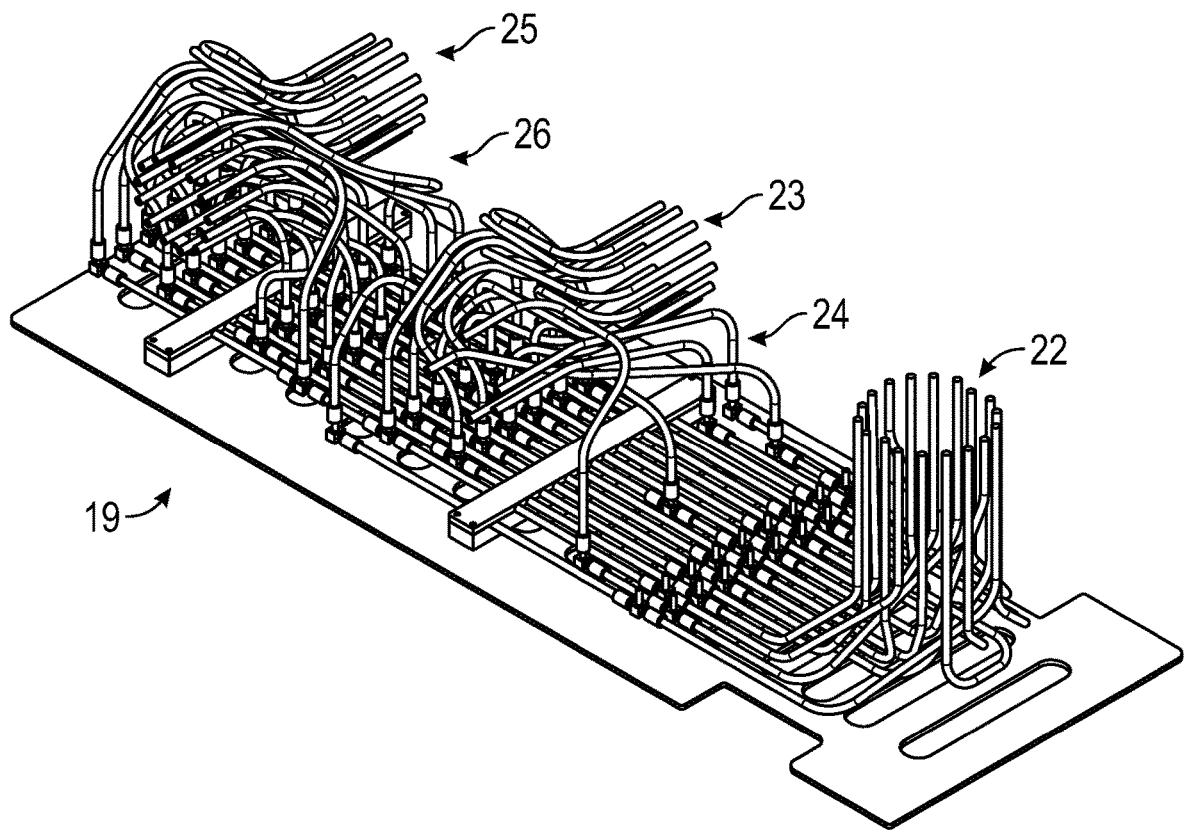

FIG. 11 illustrates the installation of a distribution module (24), wherein the pipes of the distribution module (24) are connected to the mat connectors (19), the distribution module (24) can be connected to a manifold, for example. FIG. 12 illustrates the installation of a distribution module (25) and FIG. 13 illustrates the installation of a distribution module (26), the distribution modules (25) and (26) being connected to the pipe mat (19).

Figure 14:
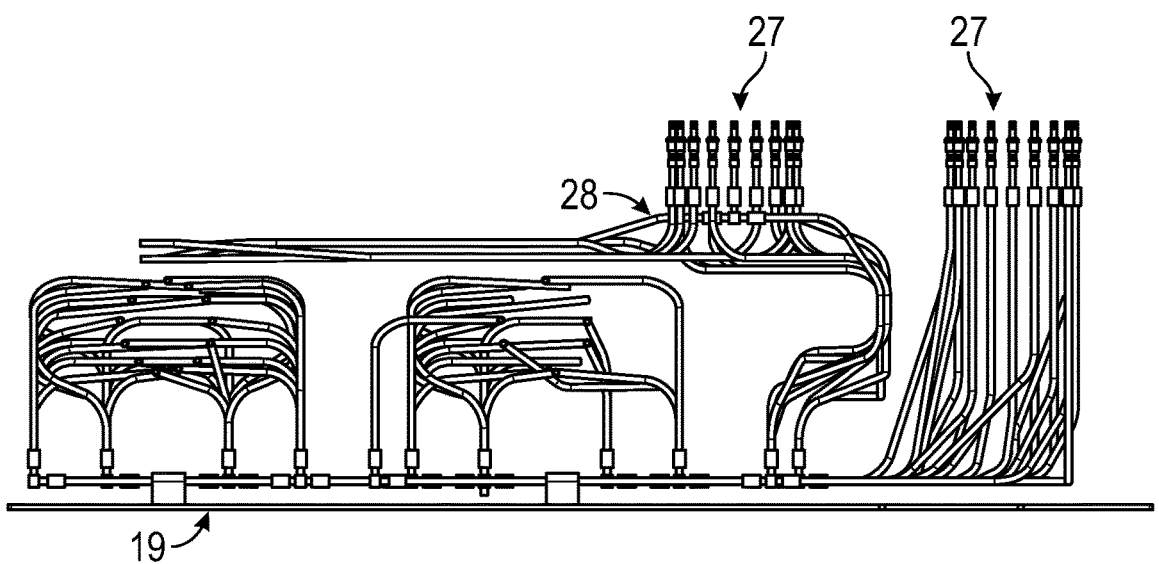
Figure 15:
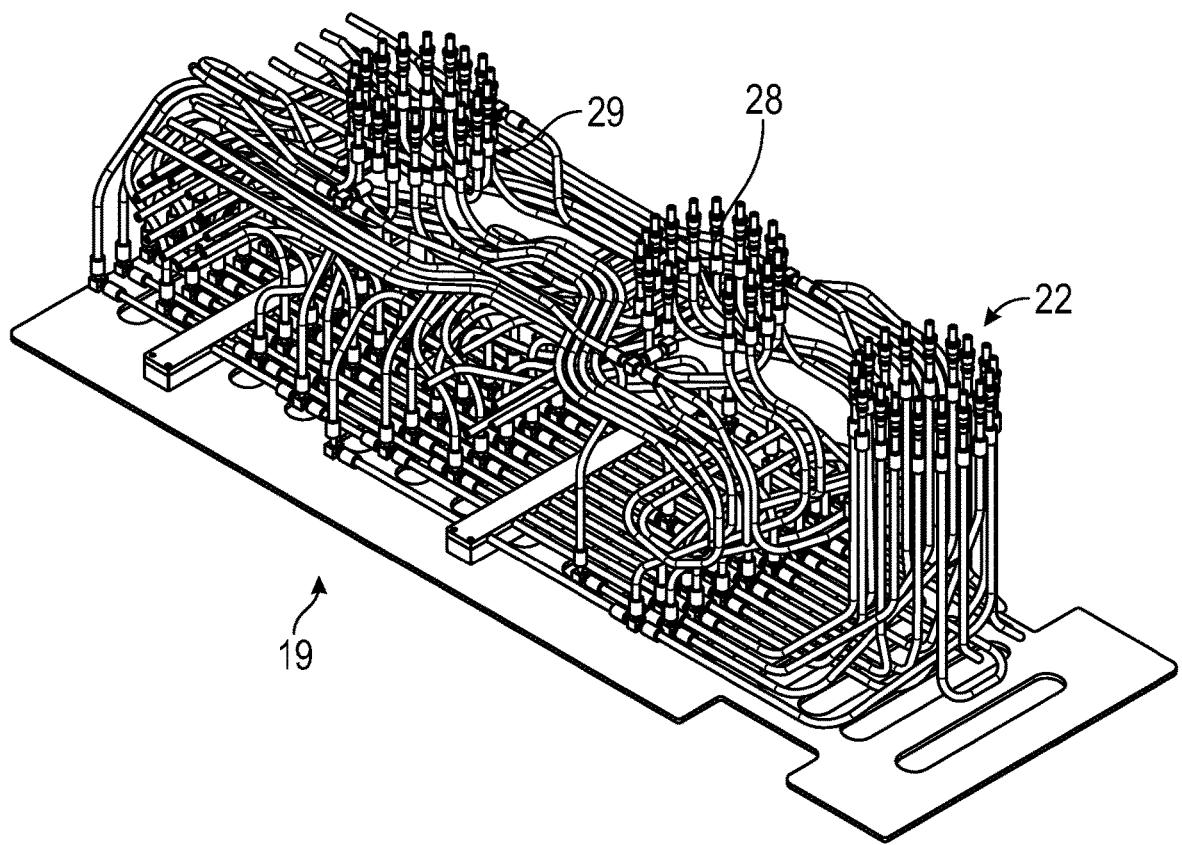
Figure 16:
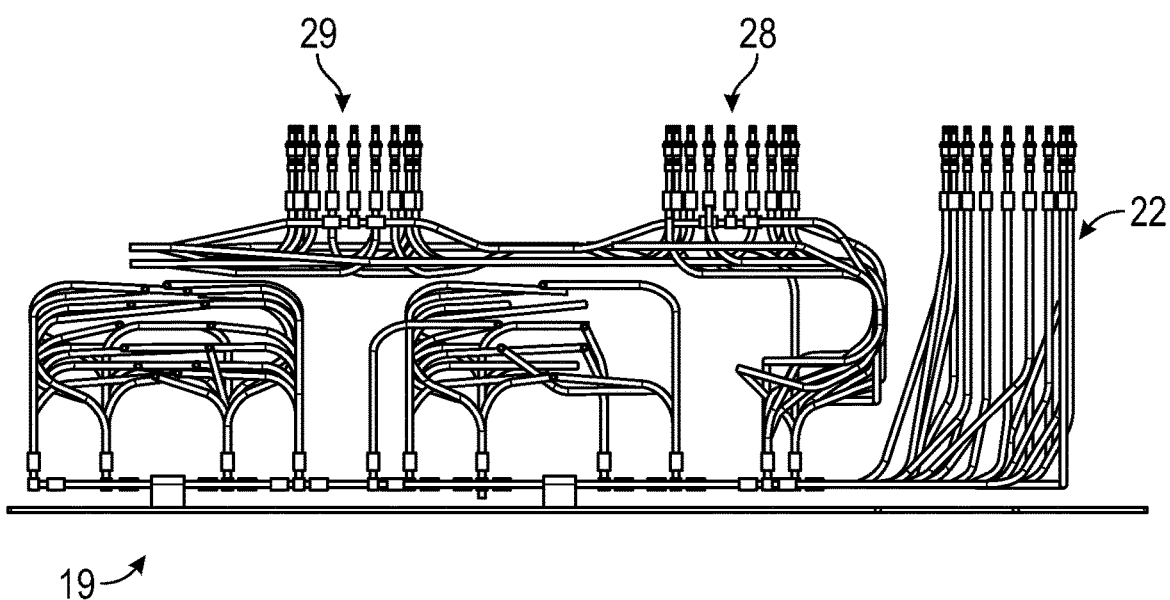

After the assembly of the distribution modules (23-26), the couplers (27) are installed in the UTAJ (22), illustrated by FIG. 14. After this step, the assembly of the pipes for the second Logic Cap (28) and the first Logic Cap (29), illustrated by FIGS. 15 and 16, is carried out, wherein the first Logic Cap (29) and the second Logic Cap (28) are connected to the pipe mat (19). The assembly where said distribution module (25) in which said MQC (23) can be connected to a distribution module (24), illustrates the installation of pipes of a MQC (22) at the end of the pipe mat (19).

Figure 17:
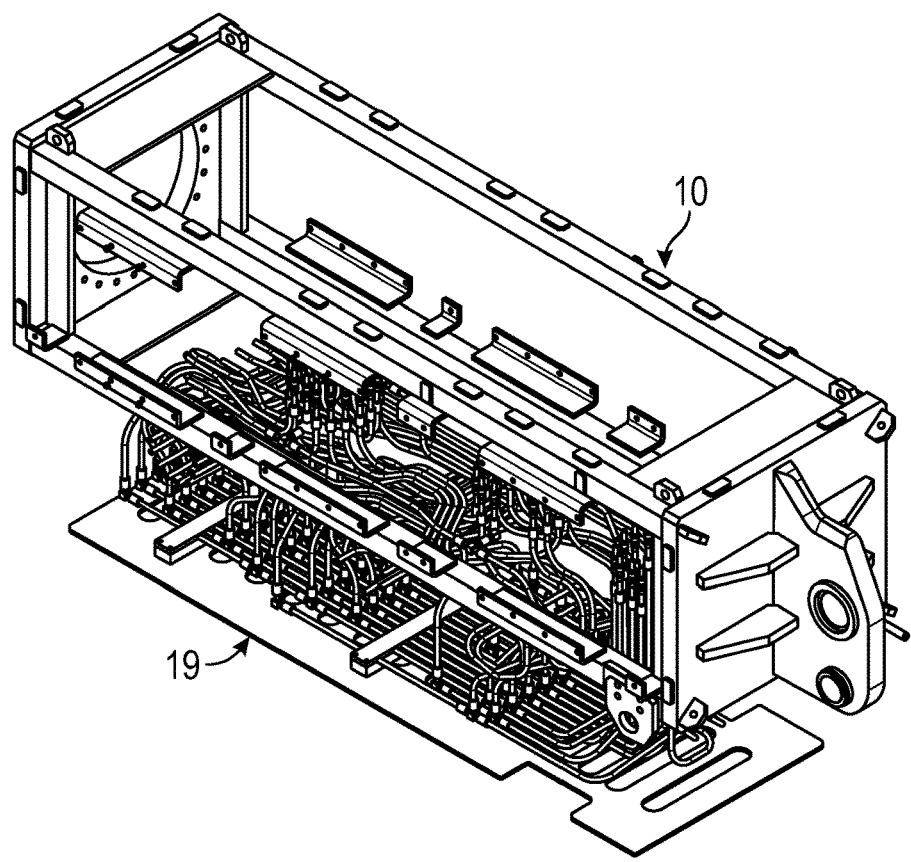
FIG. 17-18—Assembly sequence of the block in the hydraulic modularization disclosed by the present invention.
Figure 18:
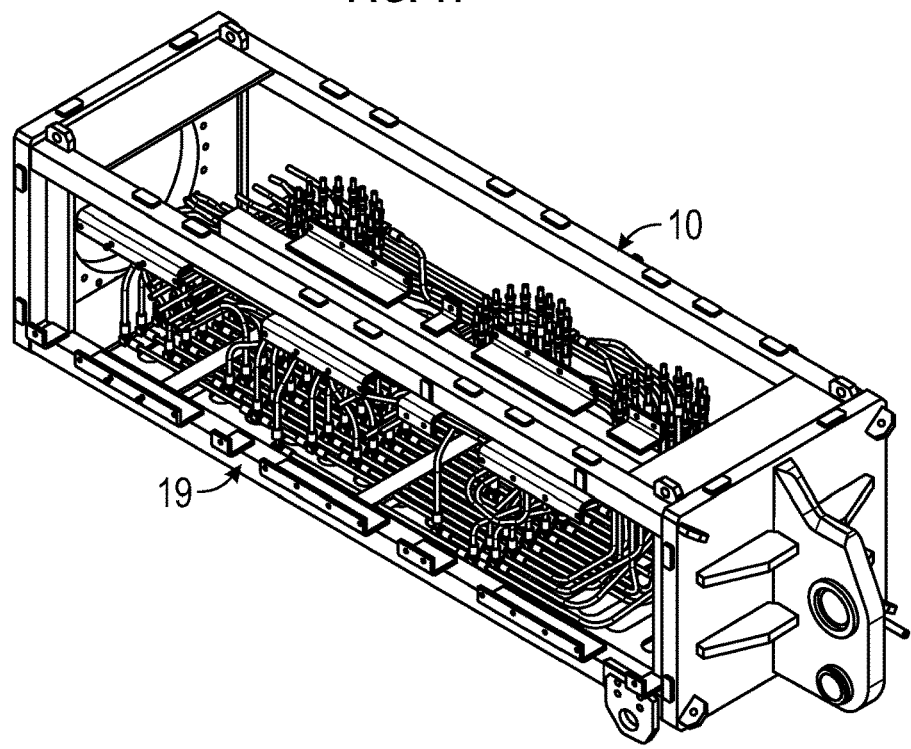

After the assembling of the Logic Caps (28) and (29), the MQC distribution modules (23-26) and the couplers (26) of the UTAJ (22) and the couplers (29) of the Logic Caps (28) and (29), the structure (11) is installed in the hydraulic configuration (30) illustrated by FIGS. 17 and 18, wherein the hydraulic configuration (30) is the configuration previously shown by FIGS. 9-16.

Figure 19:
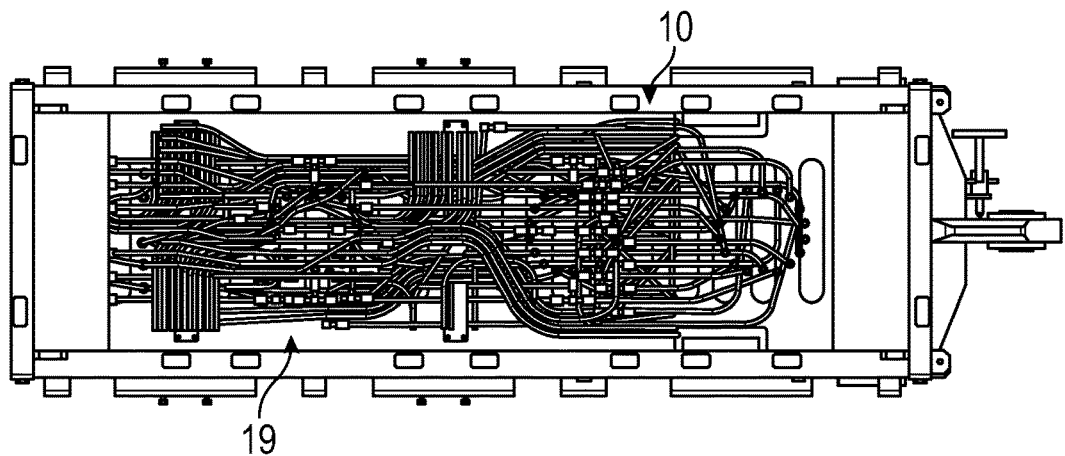
FIG. 19—Top view of the block with the hydraulic modularization of the present invention.
Figure 20:
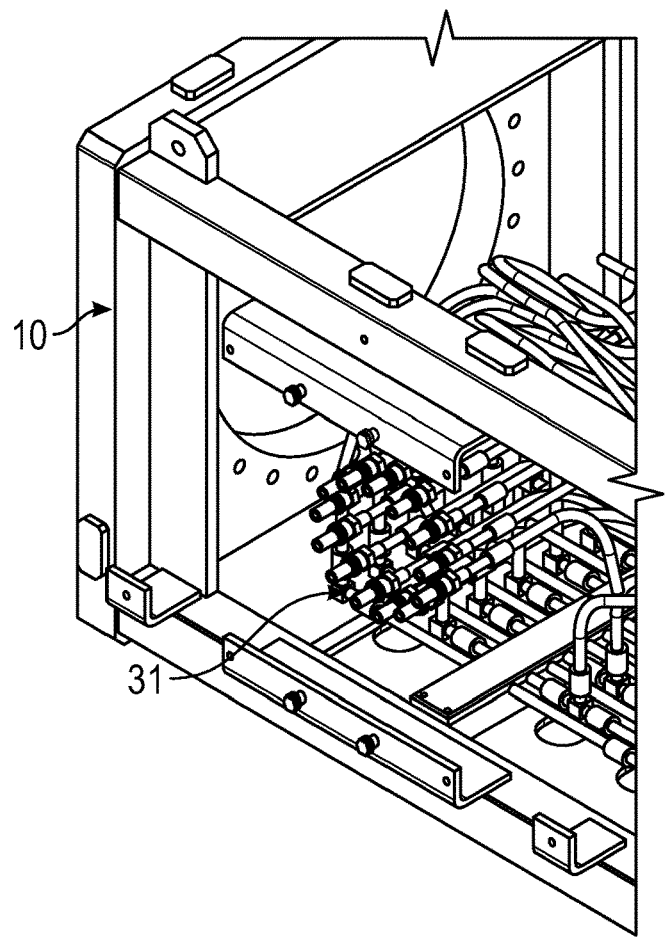
FIG. 20—Detail of the MQC couplers of the present invention.
Figure 21:
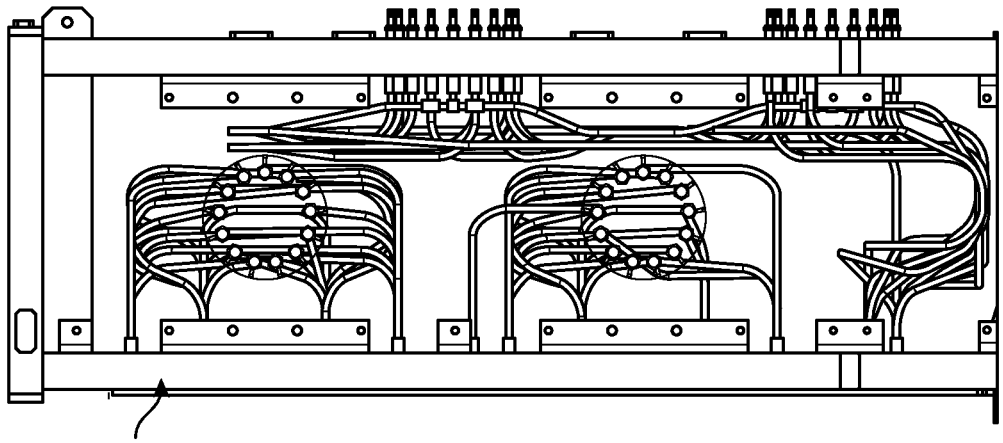
FIG. 21—Side view of the block with the hydraulic modularization of the present invention.
Figure 22:
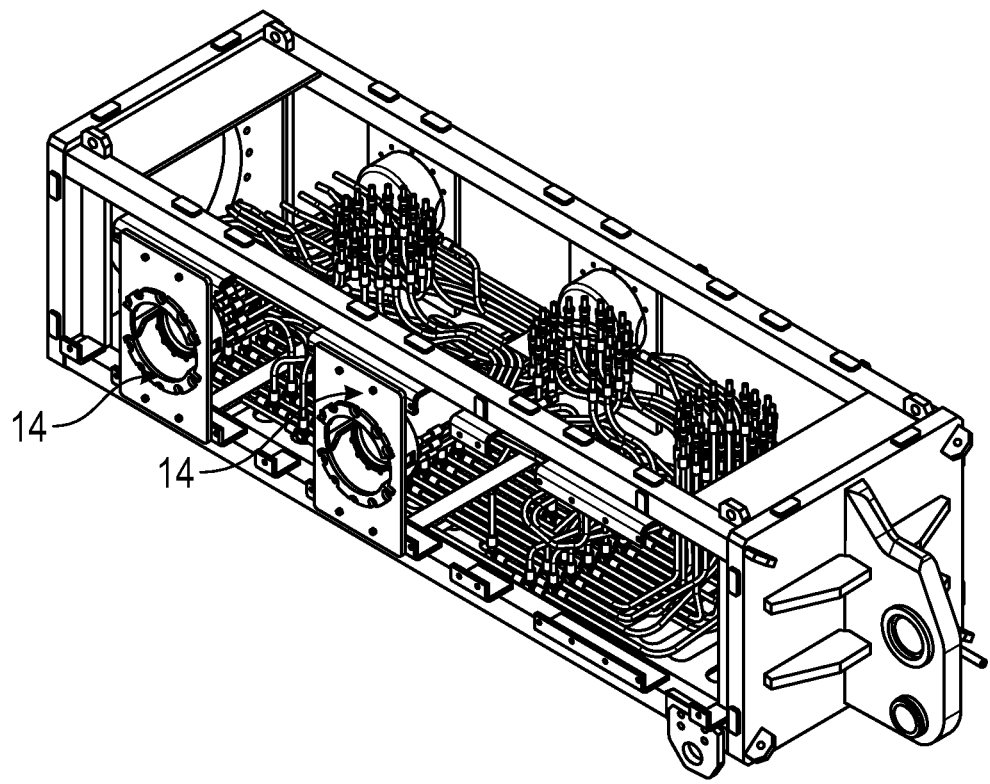
FIG. 22—Perspective view of the block with the MQC of the present invention.
Figure 23:
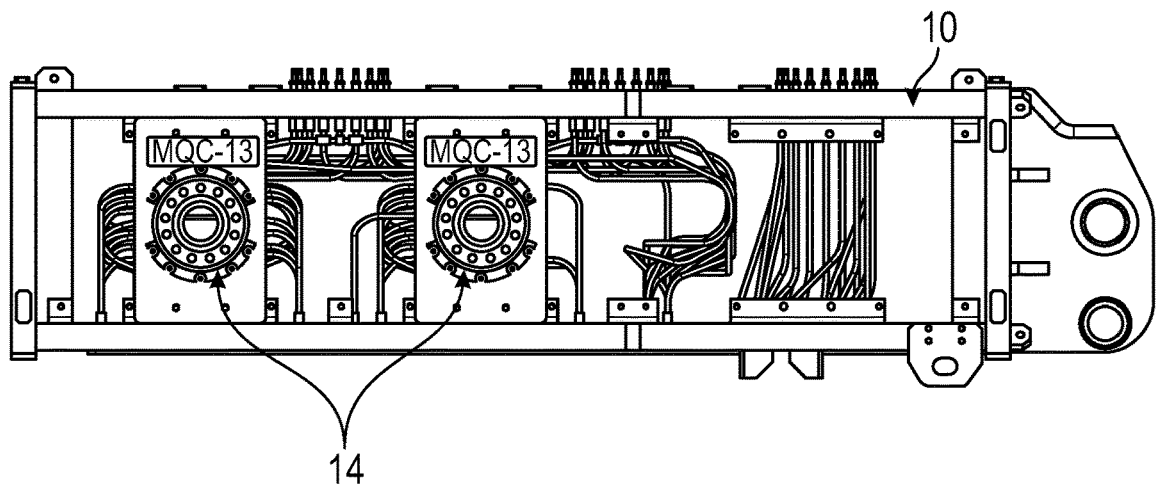
FIG. 23—Side view of the block with the MQCs of the present invention

As can be seen in FIG. 19, the metallic structure (11) does not come into contact with the pipes of the MQC distribution modules (23-26). After the installation of the structure (11), couplers (31) are installed, as can be seen in FIGS. 20 and 21, wherein panels (13) with the MQC (14) are subsequently installed, as shown in FIGS. 22 and 24.

[Note that the pipe mat (19) allows configuring several arrangements according to the desired use. The pipe mat (19) connects with the inlet umbilicals, outlet umbilicals, as well as the MQC and Logic caps (LC), in order for the block to obtain a maximum number of functions. If there is a need for a smaller number of functions, the reduction in the number of tubbings (20), fittings, couplers and MQC will be sufficient to adapt the block (11) to the system.

Electrical Instrumentation

Figure 24:
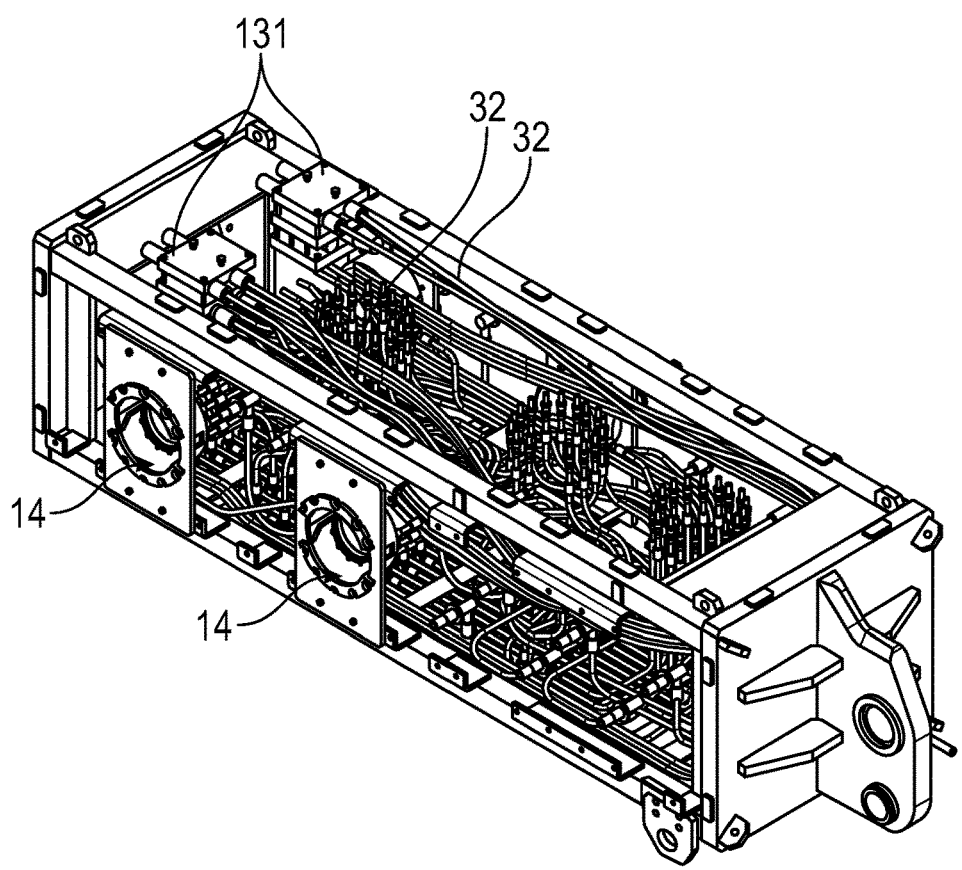
FIG. 24—Perspective view of the block with the hydraulic modularization and electrical modularization.

As can be seen in FIG. 24, the electrical instrumentation is modularized inside the structure (11), so that each structure (11) has the same electrical scheme. Therefore, it is defined a maximum number of QUADs that the structure (11) bears. These QUADs comprise the following components: junction boxes, electrical connectors (32) and Field Assembled Cable Termination (FACTs) (131). FIG. 24 illustrates the location of the FACTs (131) and the electrical connectors (32). These components are connected to the inlet and outlet umbilicals. Thus, if there is a need to bear fewer QUADs, it will be necessary only to remove the electrical connectors, FACTs and modify the junction box.

Embodiments

Using the modularization proposed above, two embodiments for two SDAs (40) and (50), according to the present invention, are provided.

Figure 25:
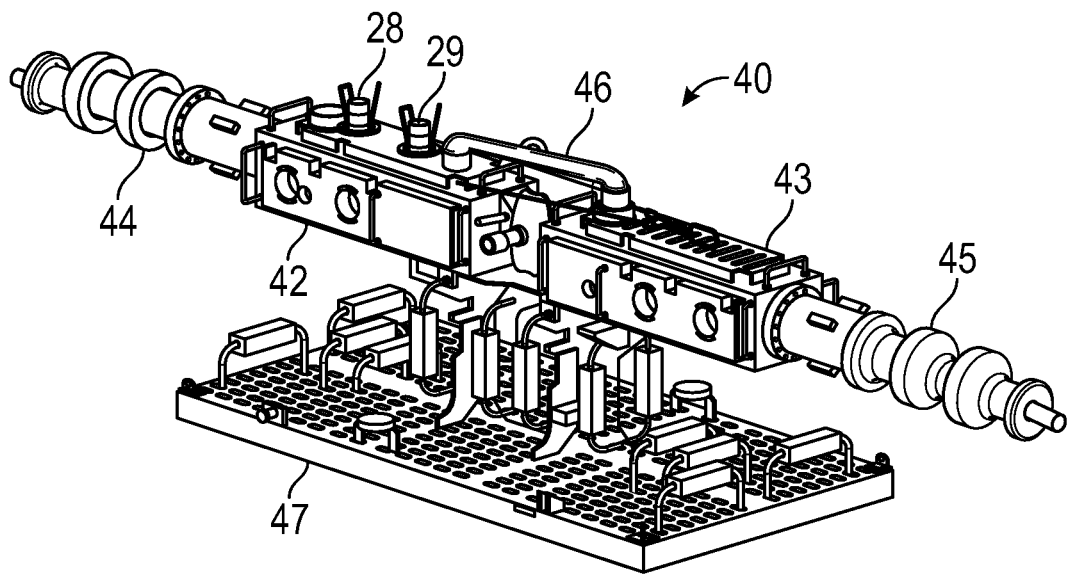
FIG. 25—Perspective view of the SDA of the present invention.

As can be seen in FIG. 25, the first embodiment consists of an SDA (40) in line with an eye joint (49). The SDA (40) comprises two blocks (42) and (43), wherein said blocks (42) and (43) will be used as Subsea Umbilical Termination (SUT), wherein the block (42) comprises a structure (11), MQC (14) and Logic Caps (28) and (29) and UTAJ (22), at its end, the block (42) comprises a Subsea Termination Interface (STI) (44), wherein said STI is connected to the umbilical cable (35), at its other end, the block (42) comprises an eye joint (49), the block (42) further comprising a pin (66) in its lower portion, wherein said pin (66) can be seen in FIG. 26. The block (43) comprises MQCs (14) and UTAJ (46), at one of its ends, the block (43) comprises an STI (45) that connects to an umbilical cable (36). At its other end, the block (43) comprises an eye joint (49).

Figure 26:
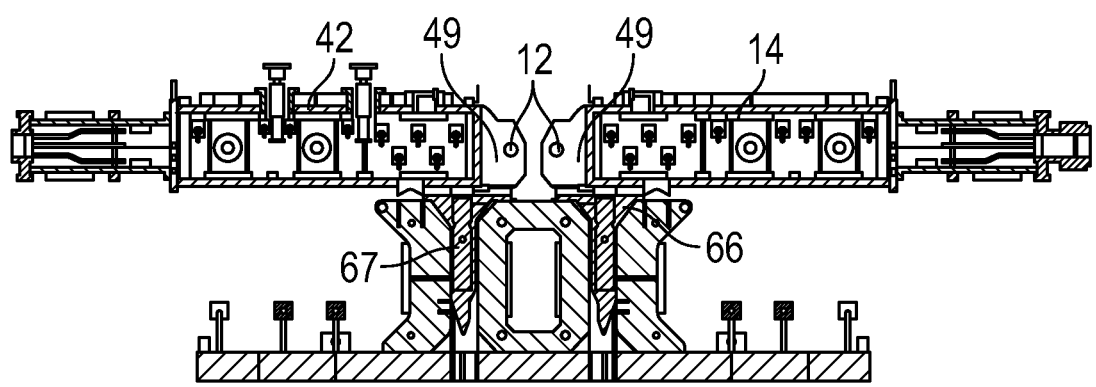
FIG. 26—Side view of the SDA of the present invention.

The two blocks (42) and (43) are mounted on a foundation (47), where said foundation (47) comprises a funnel (67), as can be seen in FIG. 26, wherein the funnels (67) serve to house the pins (66) of the blocks (42) and (43). The eyes (49) of the blocks (42) and (43) are used to connect said blocks (42) and (43). In addition, UTAJ (46) links blocks (42) and (43).

Figure 45:
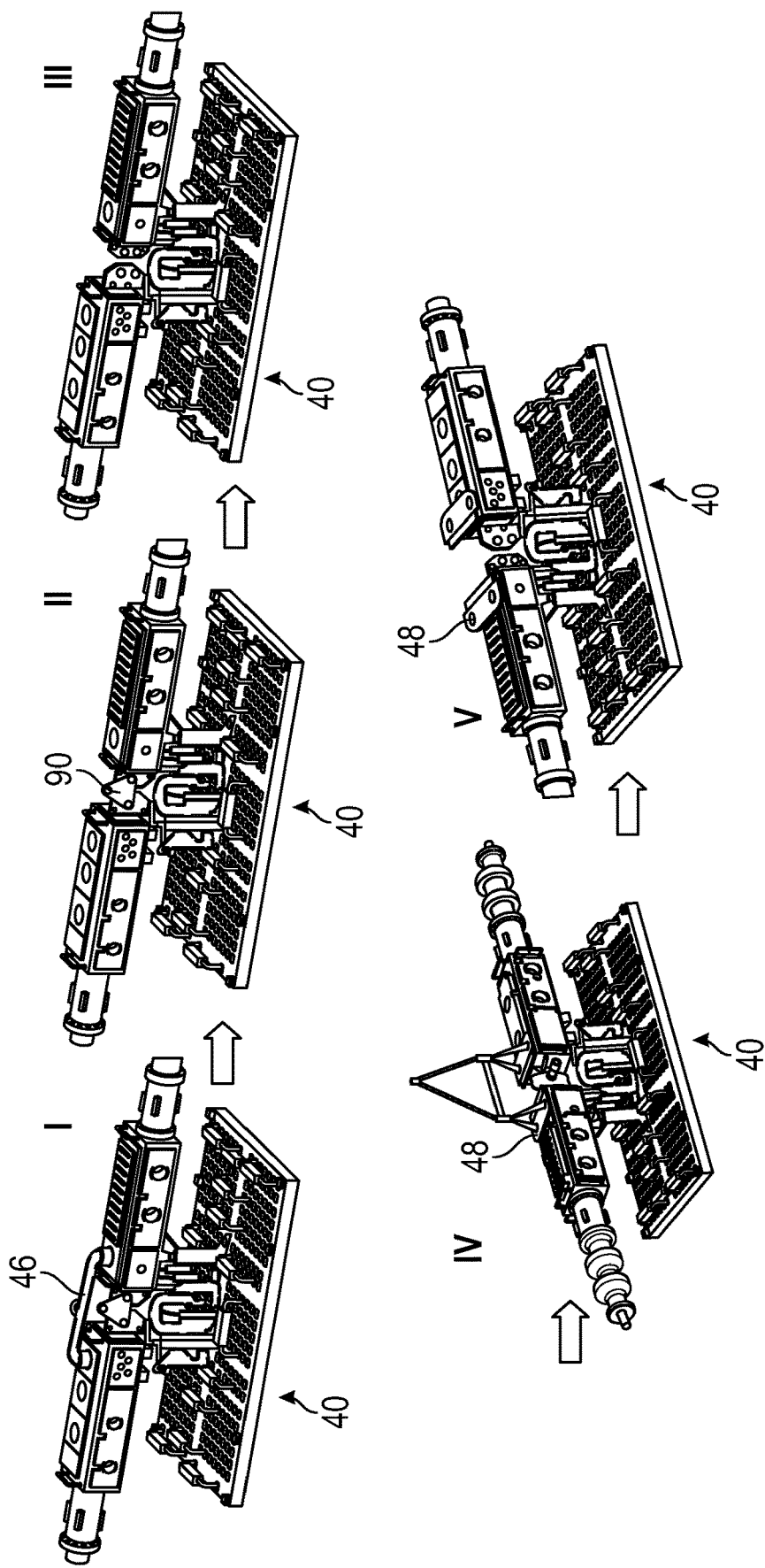
FIG. 45—Sequence of the process of replacing the temporary umbilical termination assembly jumper (UTAJ) with the permanent UTAJ according to the present invention.

It is important to mention that the UTAJ (46) is temporary, after the installation of the SDA (40) on the seabed, a permanent UTAJ (49) is installed, as will be illustrated in FIG. 45, and the process of replacing temporary UTAJ (46) with permanent UTAJ (49) will be demonstrated below.

Figure 27:
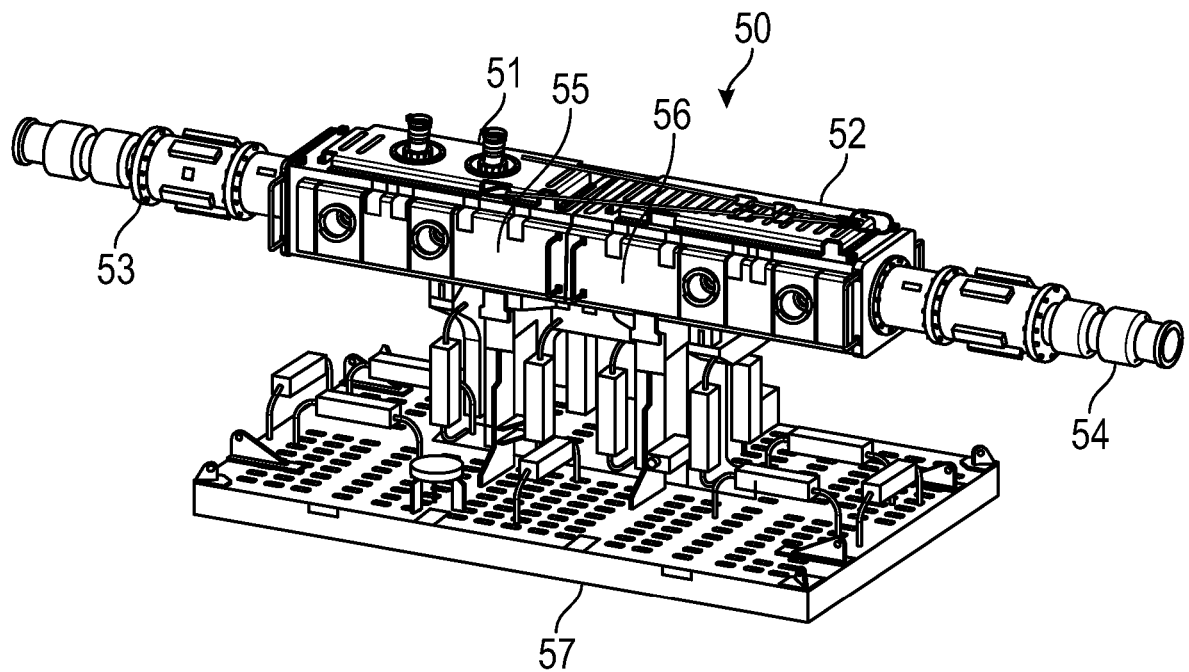
FIG. 27—Perspective view of the SDA of the present invention.
Figure 28:
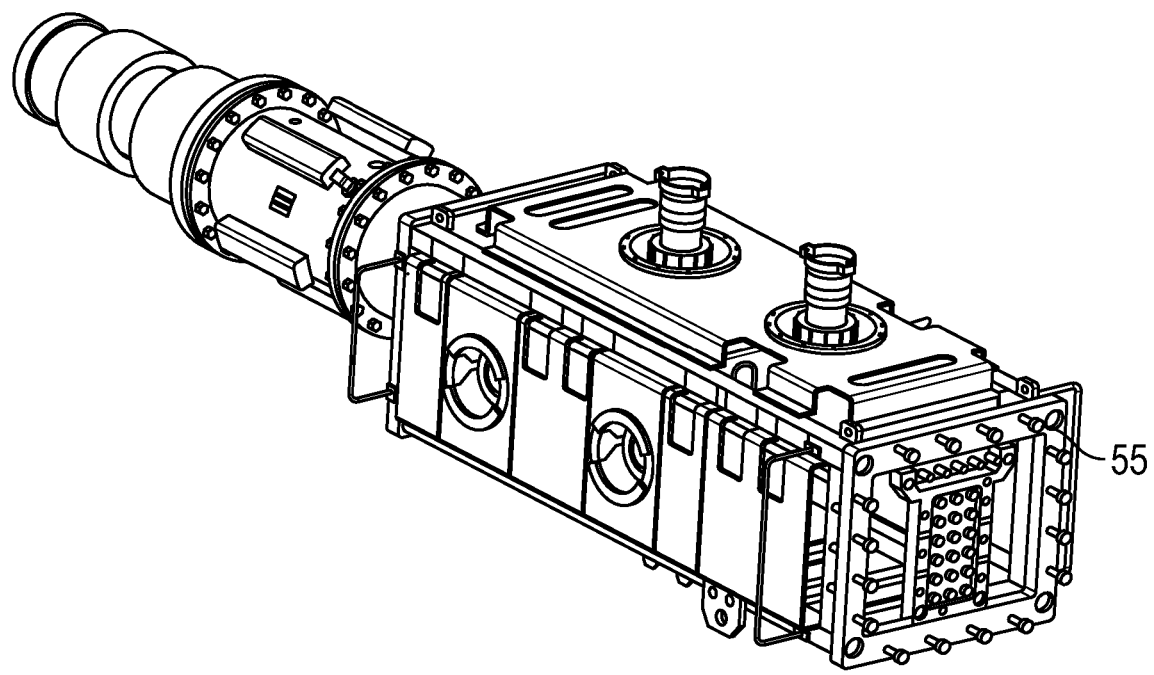
FIG. 28—Perspective view of the SDA block of the present invention.
Figure 29A:
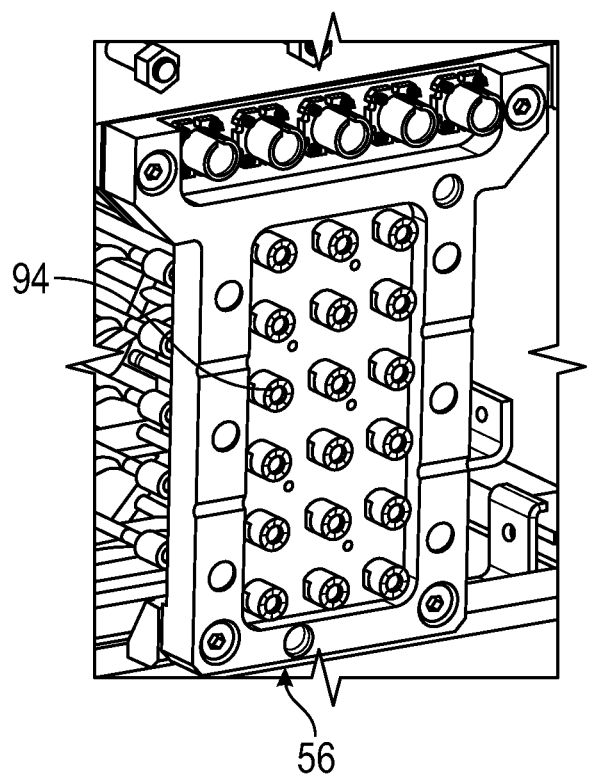
FIGS. 29A and 29B—Views of the female and male connectors, respectively, according to the present invention.
Figure 29B:
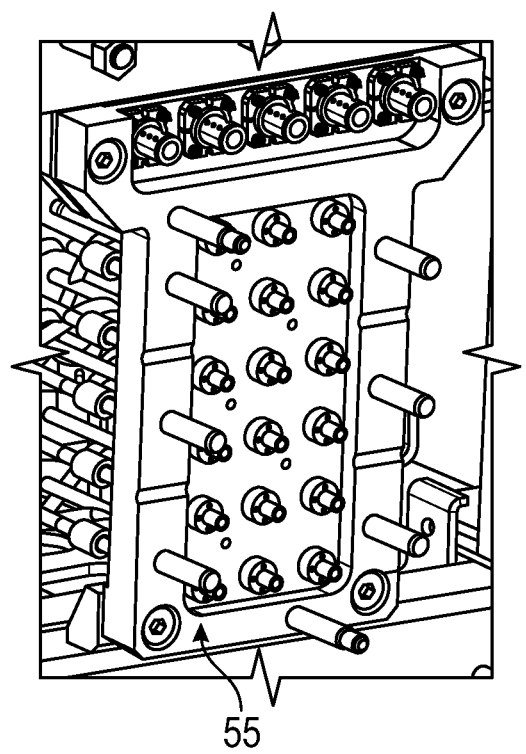
Figure 30B:
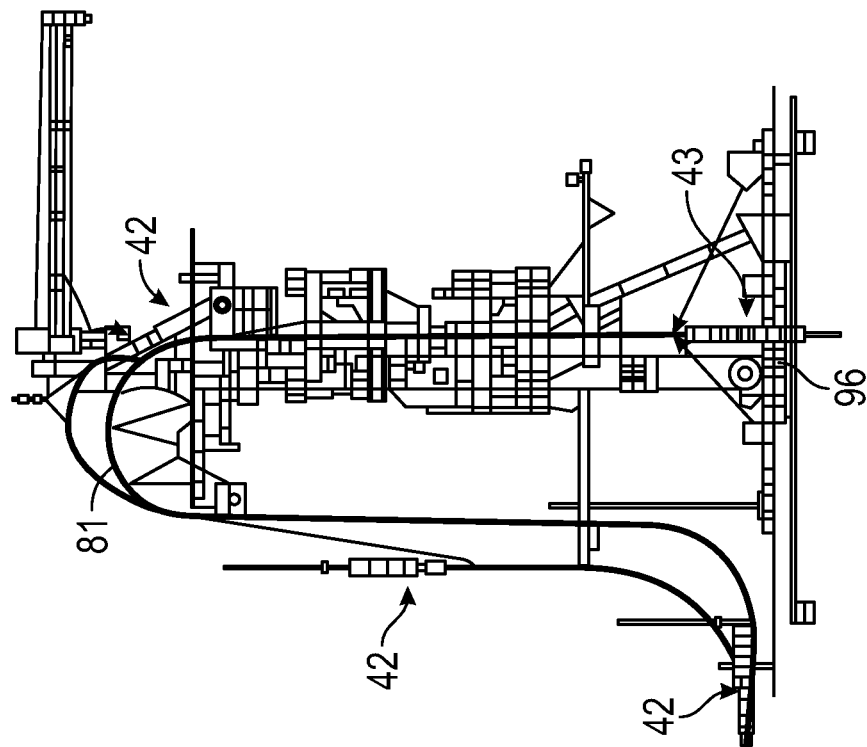
Figure 30A:
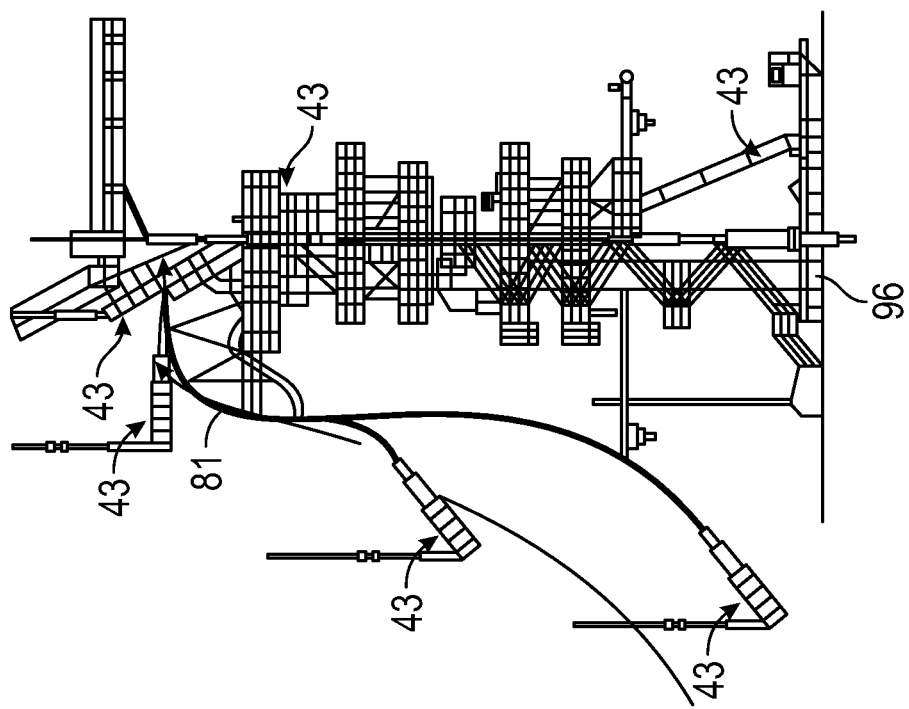

In a second embodiment, illustrated by FIG. 27, an SDA (50) is disclosed using the concepts presented herein by the present invention, wherein the SDA (50) comprises two blocks (51) and (52) that will be used as subsea umbilical termination (SUT), wherein the block (51) comprises a structure (11), MQCs (14), and Logic Caps (28) and (29). At its end, the block (51) comprises a STI (53), illustrated by FIGS. 27 and 28, which connects to an umbilical cable (35). The block (52) comprises a structure (11) and MQCs (14) and, at its end, the block (52) comprises a STI (54) to be connected to the umbilical cable (36). The connection between blocks (51) and (52) is made through a flange gasket, where block (51) comprises a male connector (55) and block (52) comprises a female connector (56), as seen in FIGS. 29A and 29B. Blocks (51) and (52) are connected to a foundation (57), with this connection being made by screws, as can be seen in FIGS. 30A and 30B.

These embodiments of SDA (40) and (50) have a lower weight compared to the SDA (01) of the art, wherein SDA (01) weights 28,000 kgf, while the SDA (40) weights 12,000 kgf and the SDA (50) weights 9,000 kgf.

Assembly

Among the factors that are important for the assembly of the SDA (40) and (50), the limitations of the tower, the gutter, A&R, the tensioners' opening, deflectors, and the sizes of the work floor of a vessel should be highlighted. SDAs (40) and (50) allow their assembly to be carried out on smaller vessels, in order to reduce the cost of renting vessels, since SDAs (40) and (50) have fewer components and consequently less weight. In addition, the SDAs (40) and (50) disclosed herein further are smaller.

Figure 31B:
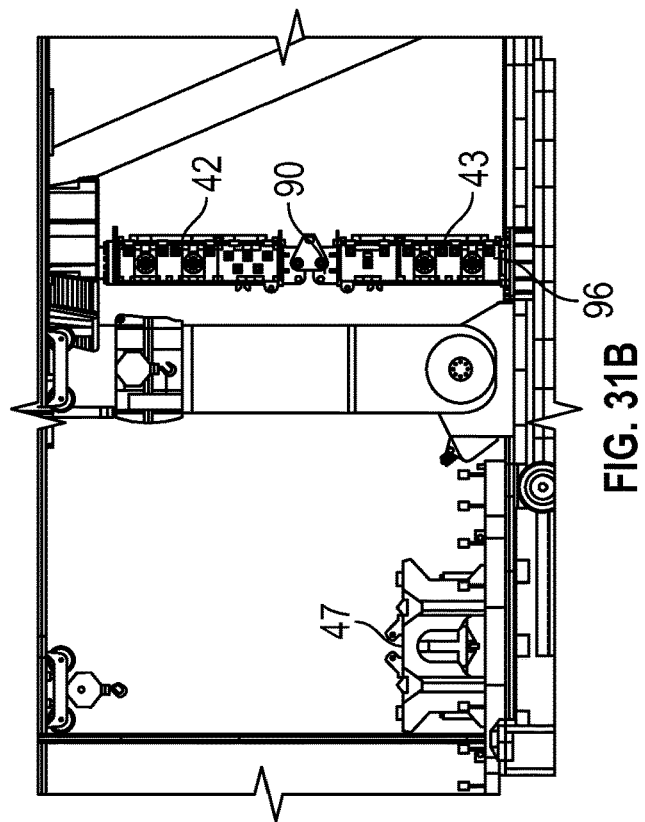
Figure 31A:
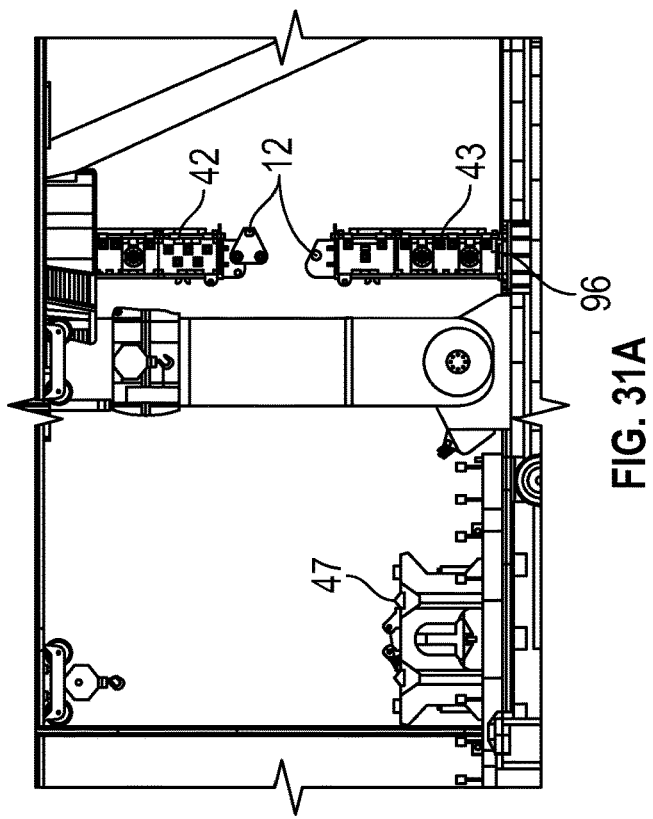
Figure 33B:
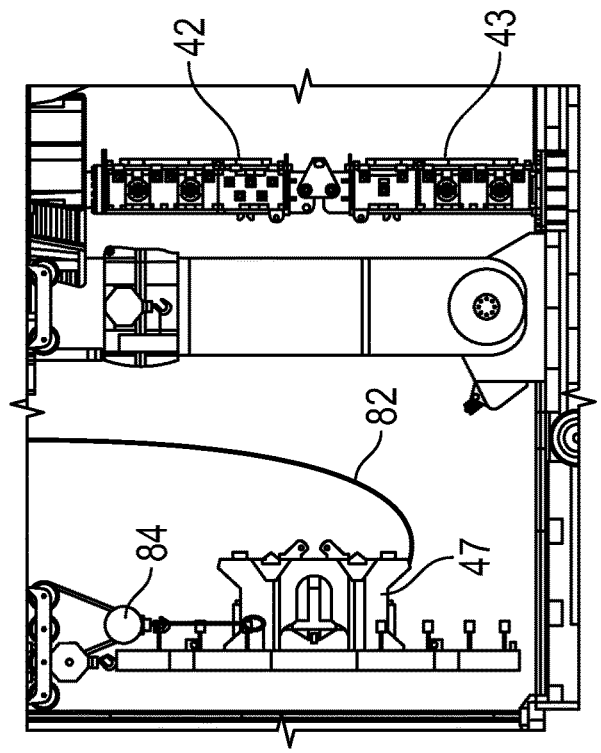
Figure 33A:
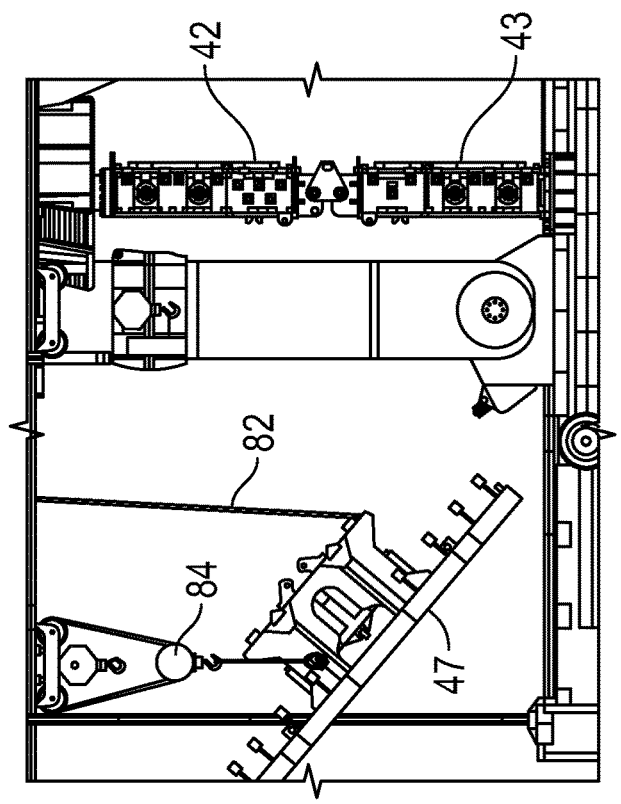
Figure 34B:
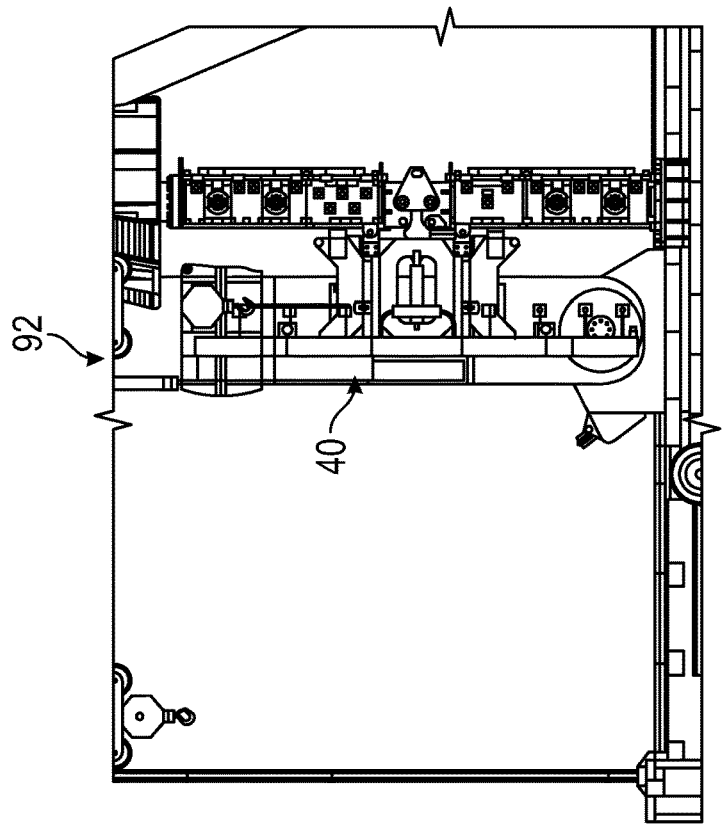
Figure 34A:
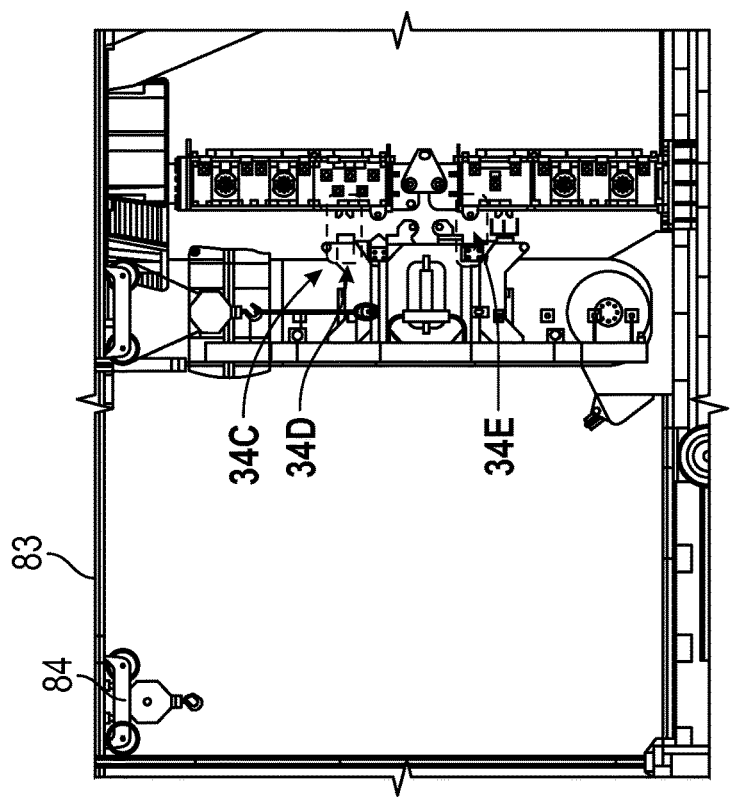
Figure 34C:
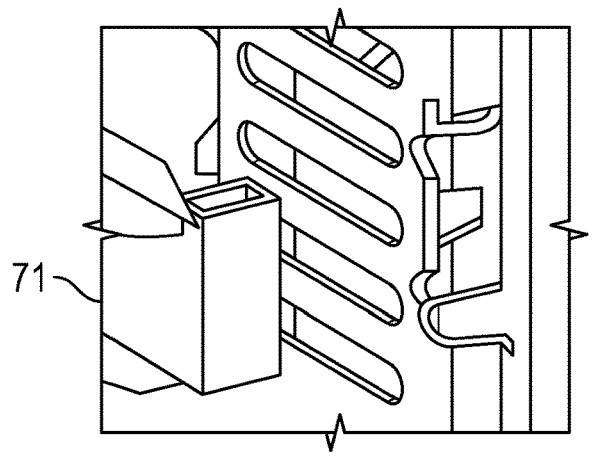
Figure 34D:
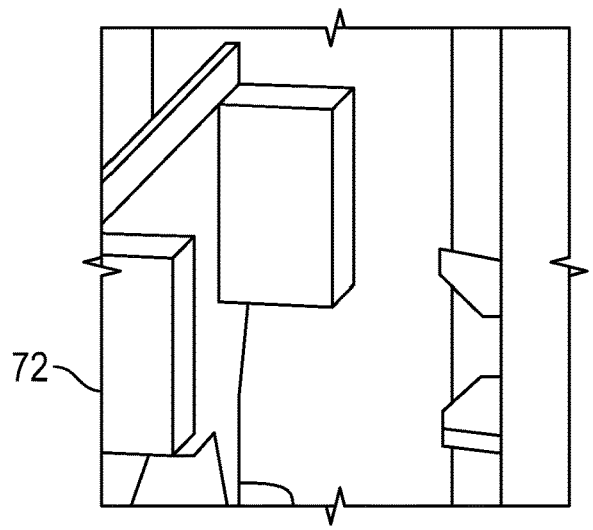
Figure 34E:
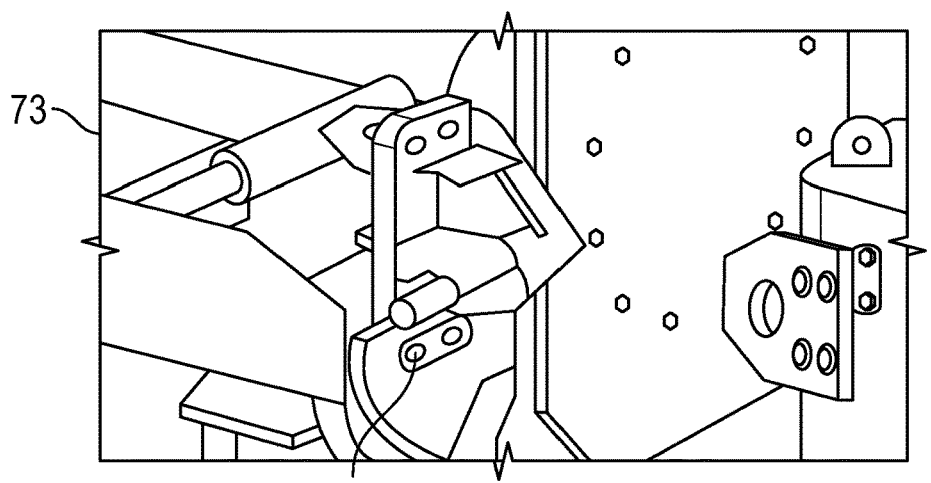

Therefore, the present invention allows the assembly of the SDAs using the structure of the existing vessel in order to reduce assembly and installation costs of the SDA. Later, the assembly of the SDA (40) and (50) on a vessel (85) will be disclosed. The assembly is carried out on the deck of the vessel (85) and comprises the following steps, which are illustrated by FIGS. 30-34:

a) As can be seen in FIGS. 30A and 30B, block (43) is transported from the spool using the gutter (81), tensioners (82) and the crane (83) of the vessel (85), wherein said block (43) is transported to the hang-off collar (96) of the vessel (85); said block (43) being connected to the umbilical cable (35);

b) After the block (43) arrives at the hang-off collar (96), block (42) is transported and then the eye joint (49) is installed, and the block (42) is transported, as shown in FIGS. 31A and 31B;

c) After installing the eye joint (49), the eyes (12) of the blocks (42) and (43) are aligned and brought together, so that the eyes (12) are connected through the eye joint (49); as seen in FIGS. 32A and 32B;

d) After the blocks (43) and (42) are connected by the eye joint (49), the foundation (47) is installed, wherein the foundation (47) is lifted by the crane (83) and trolley (84) of the PLS (93). After the verticalization and stabilization of the foundation (47), the cable of the crane (83) is disconnected; then the crane and the trolley (85) move to the moon pool center (92); as can be seen in FIGS. 33A, 33B, 34A and 34B;

e) The foundation (47) is connected to the blocks (42) and (43), wherein the foundation (47) has a pin (71) and the blocks, on its lower portion, have a connector (72) to connect to that pin (71); and the foundation (57) also comprises gaskets (73) to be fastened by screws (94) after connecting the trolley (84), as shown in detailed views of FIG. 34A shown in FIGS. 34C-34E; the foundation (47) is released, f) then, a temporary UTAJ is installed (46) between blocks (42) and (43).

Figure 35B:
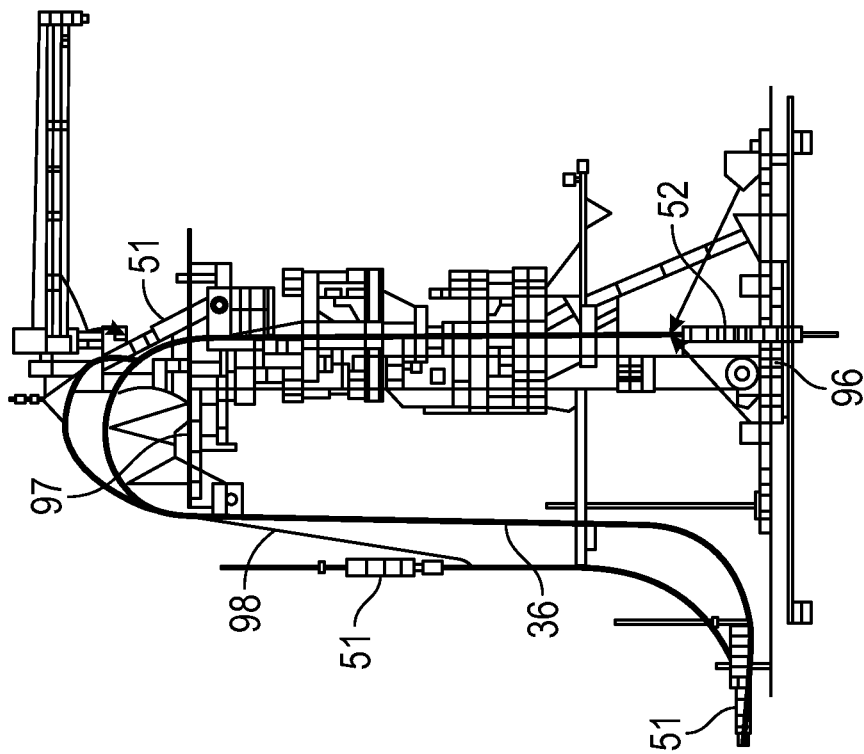
FIGS. 35-42—Assembly sequence of the SDA in line with flange gasket according to the present invention.
Figure 35A:
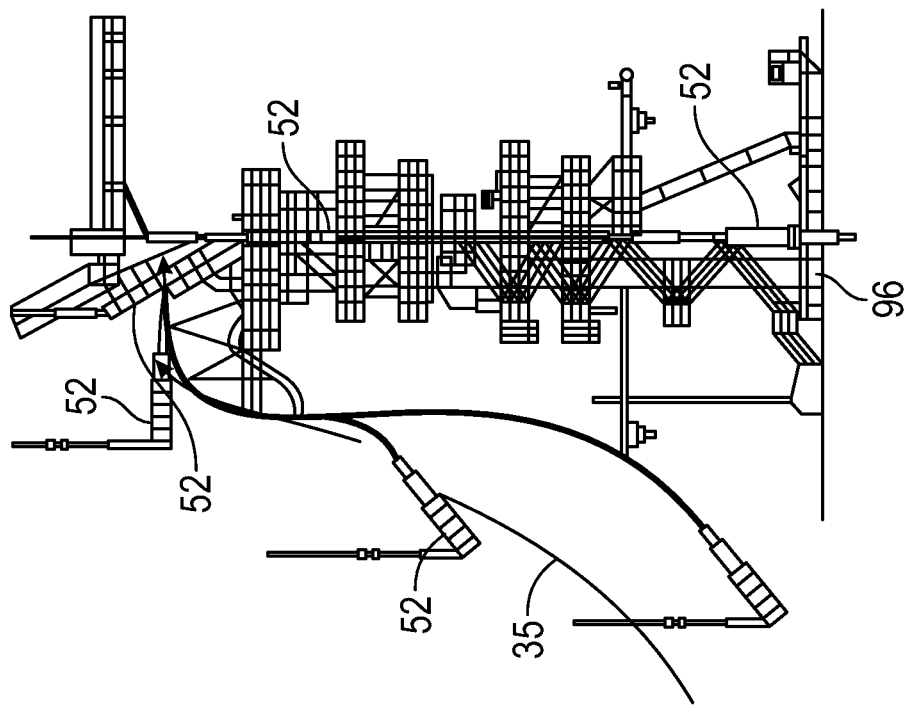
Figure 36A:
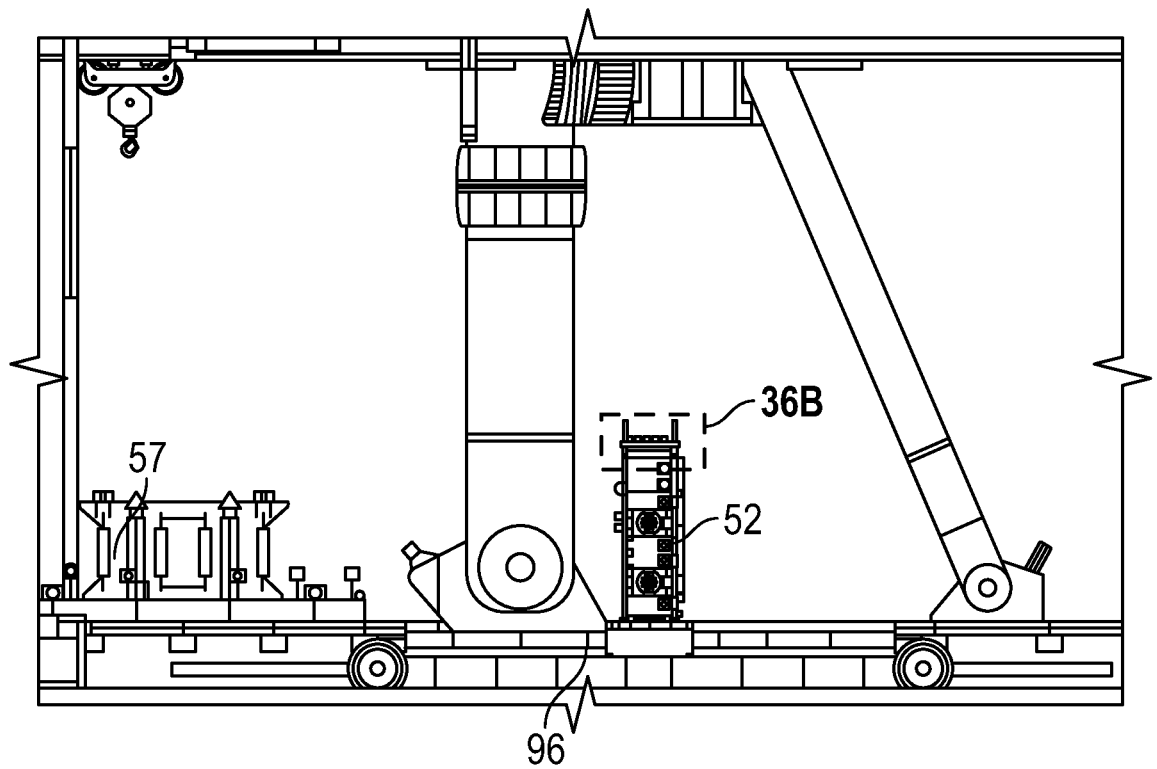
Figure 36B:
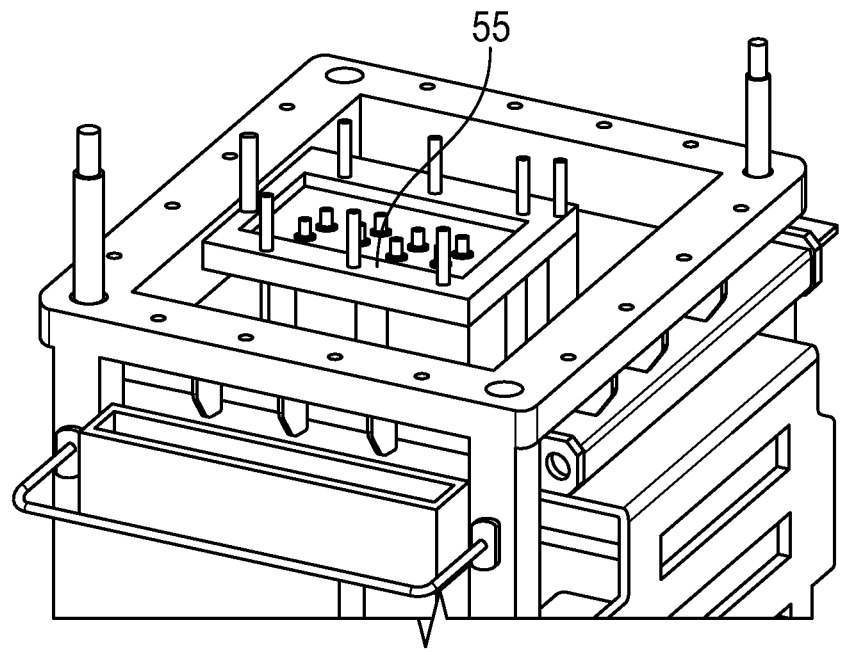
Figure 37A:
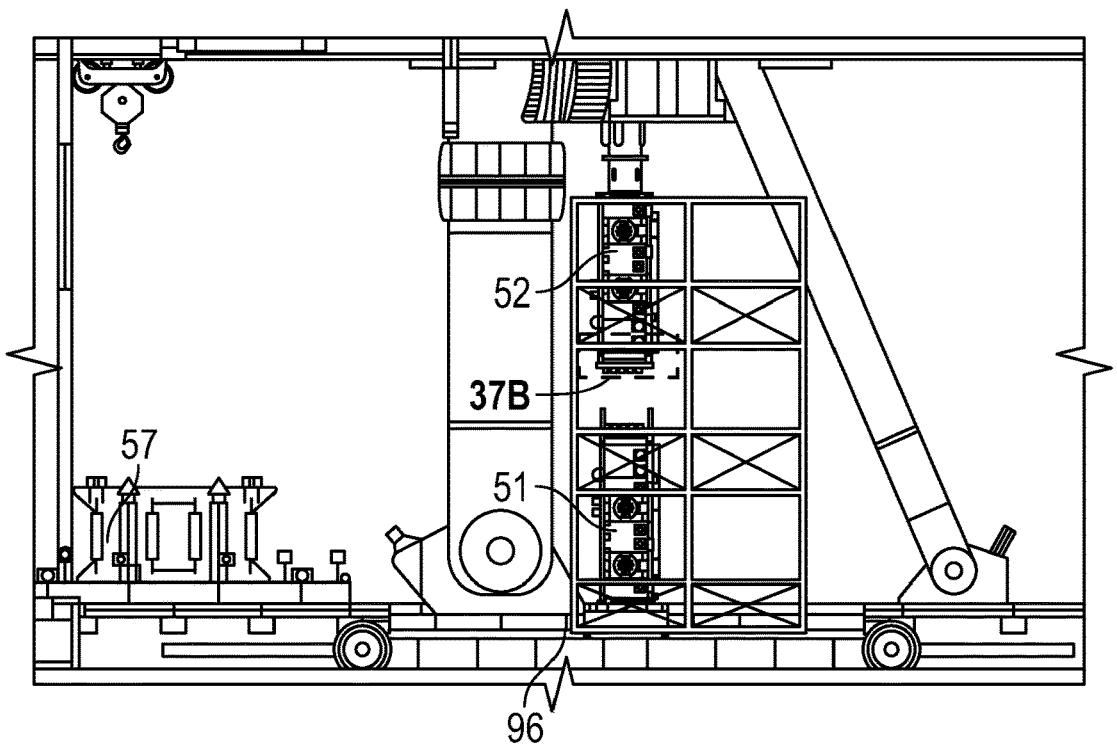
Figure 37B:
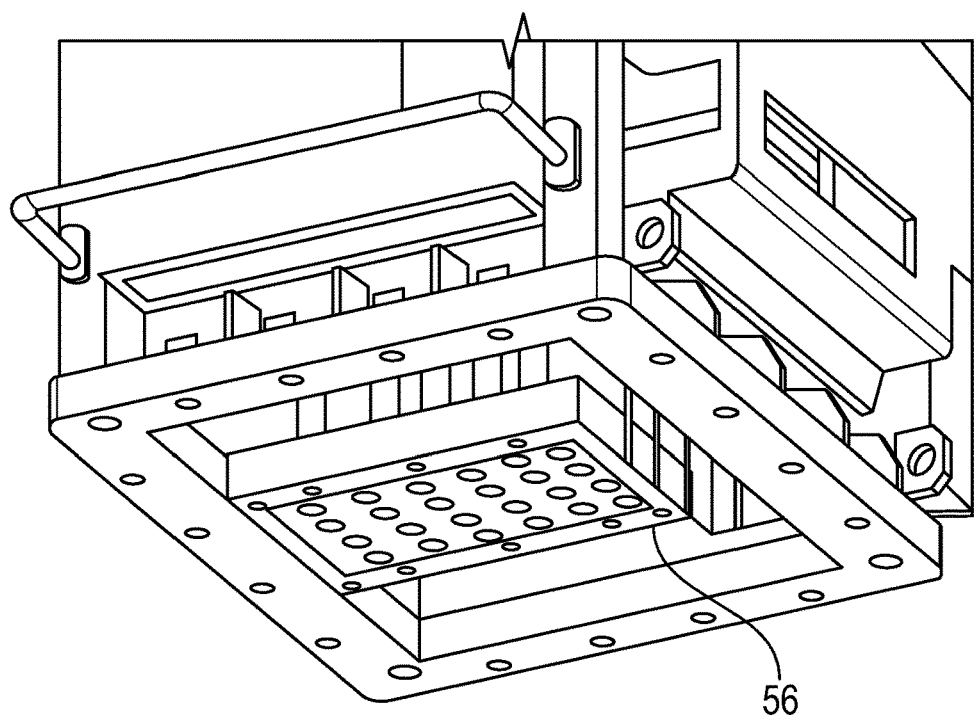
Figure 38A:
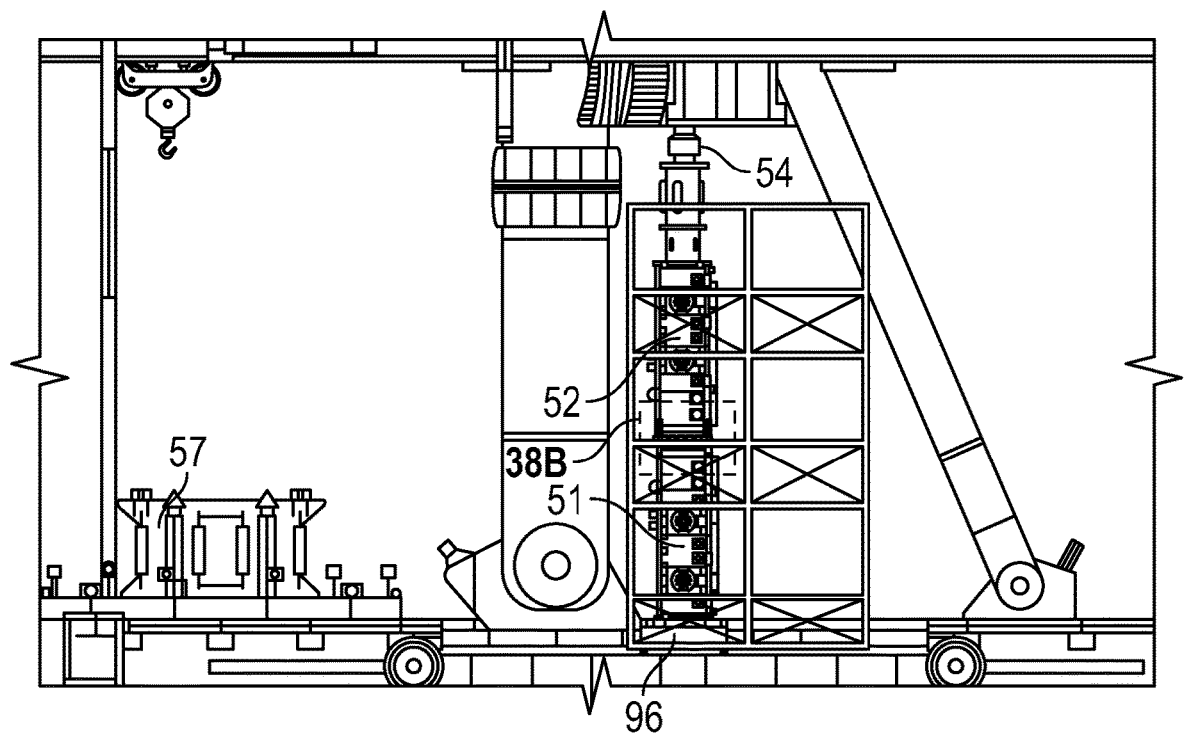
Figure 38B:
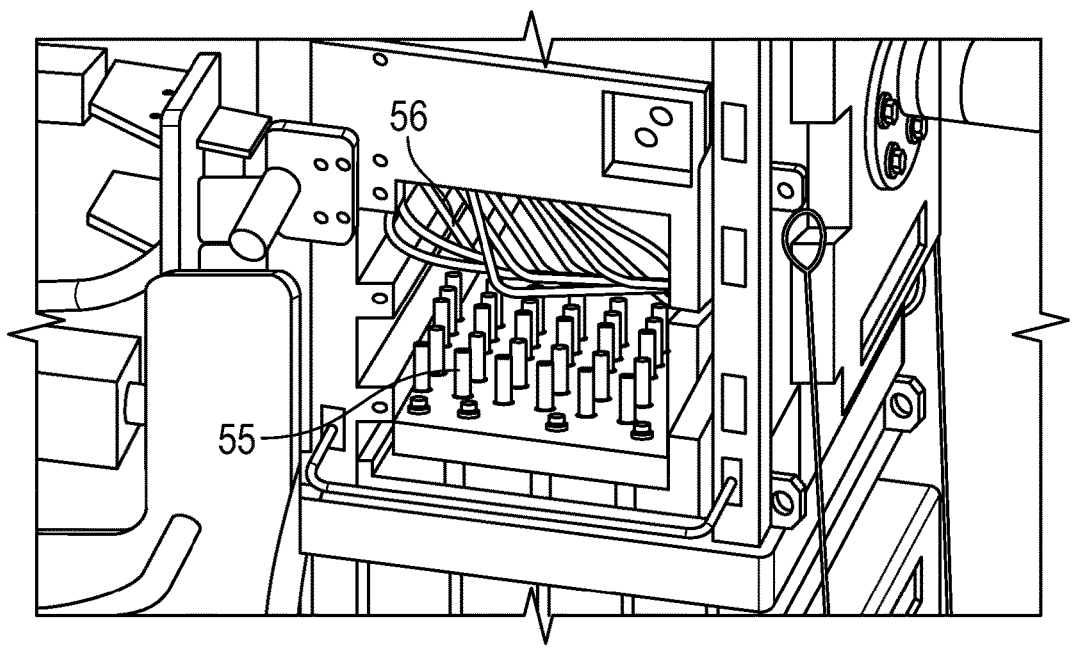
Figure 39B:
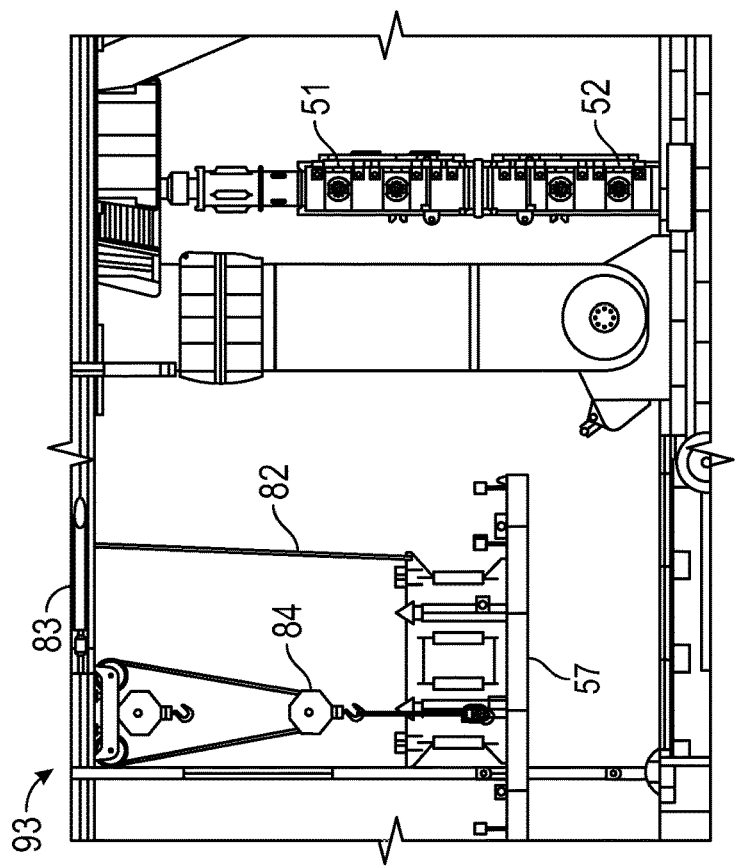
Figure 39A:
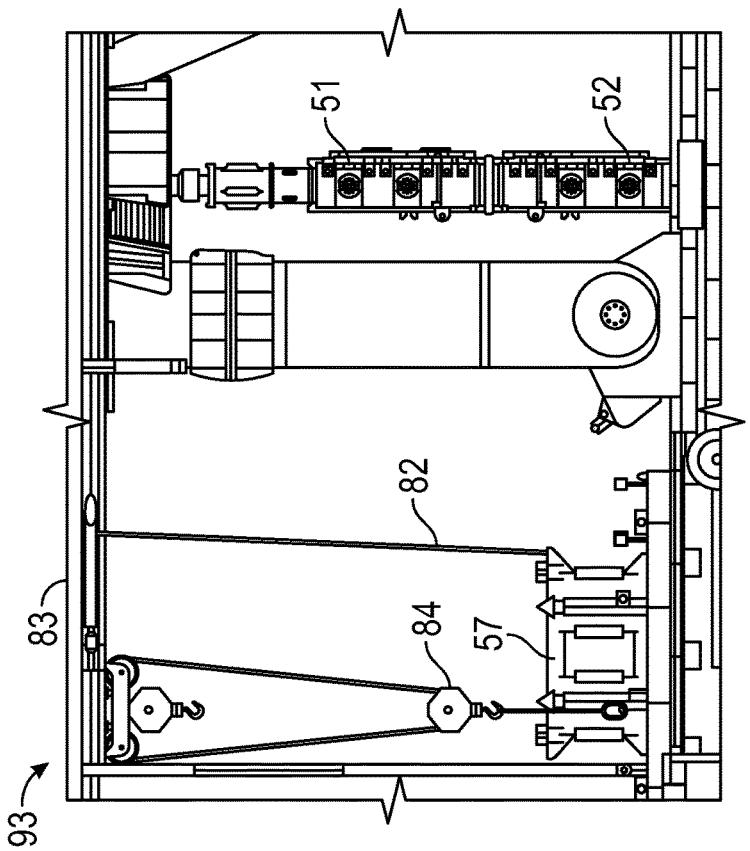
Figure 40B:
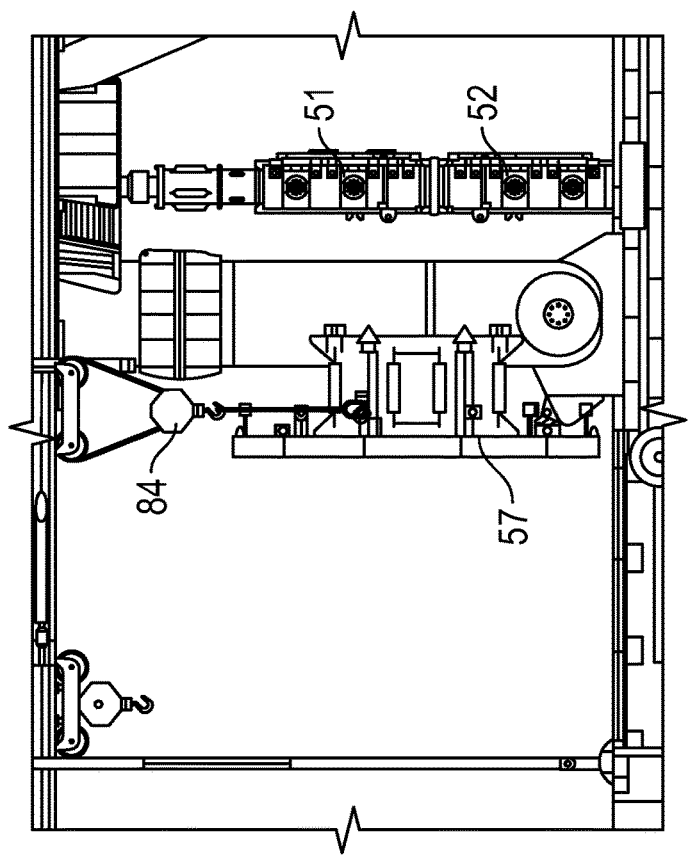
Figure 40A:
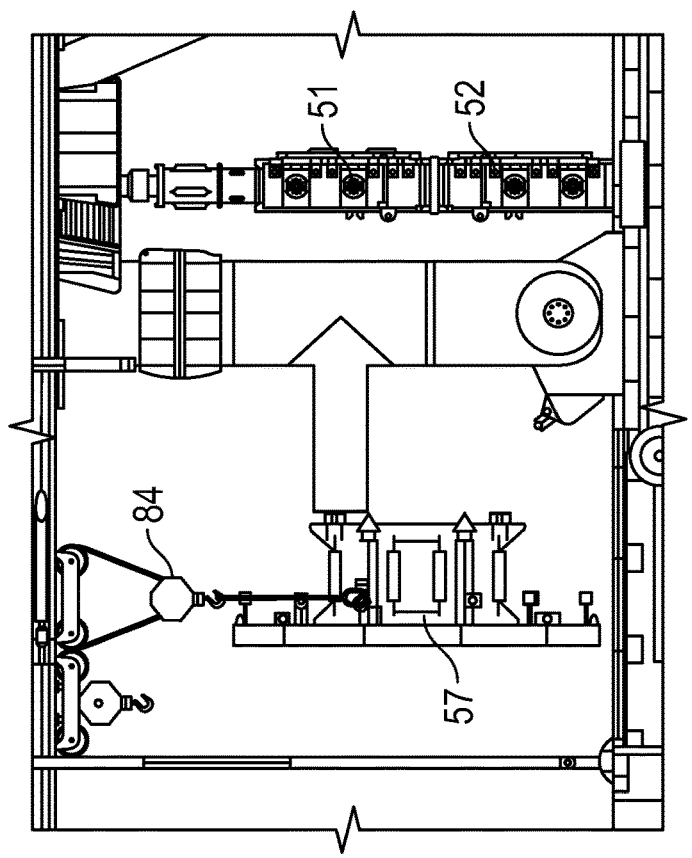
Figure 41B:
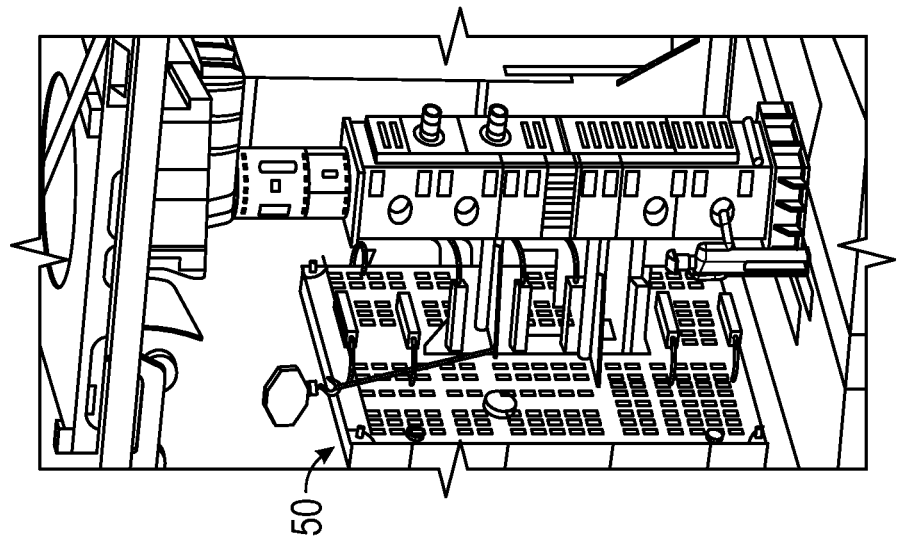
Figure 41A:
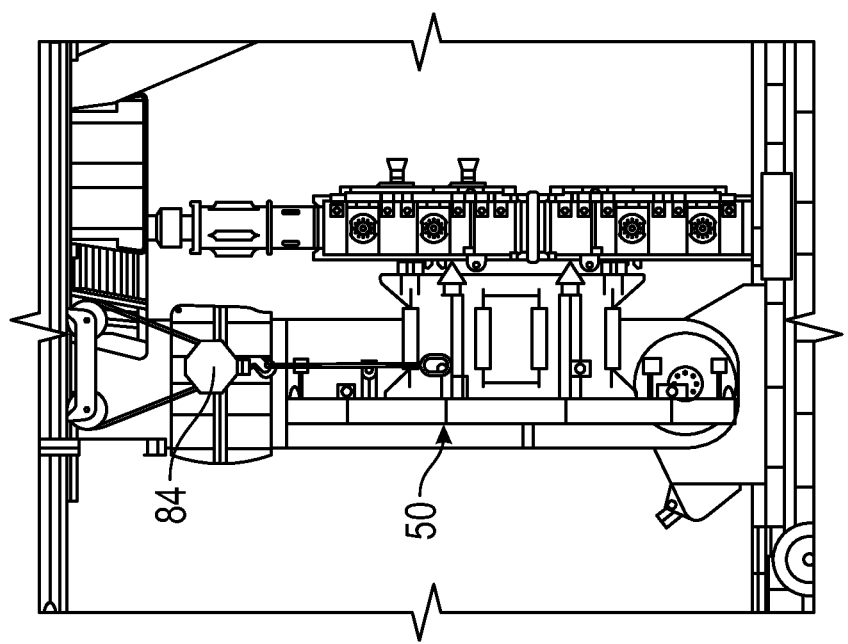
Figure 42:
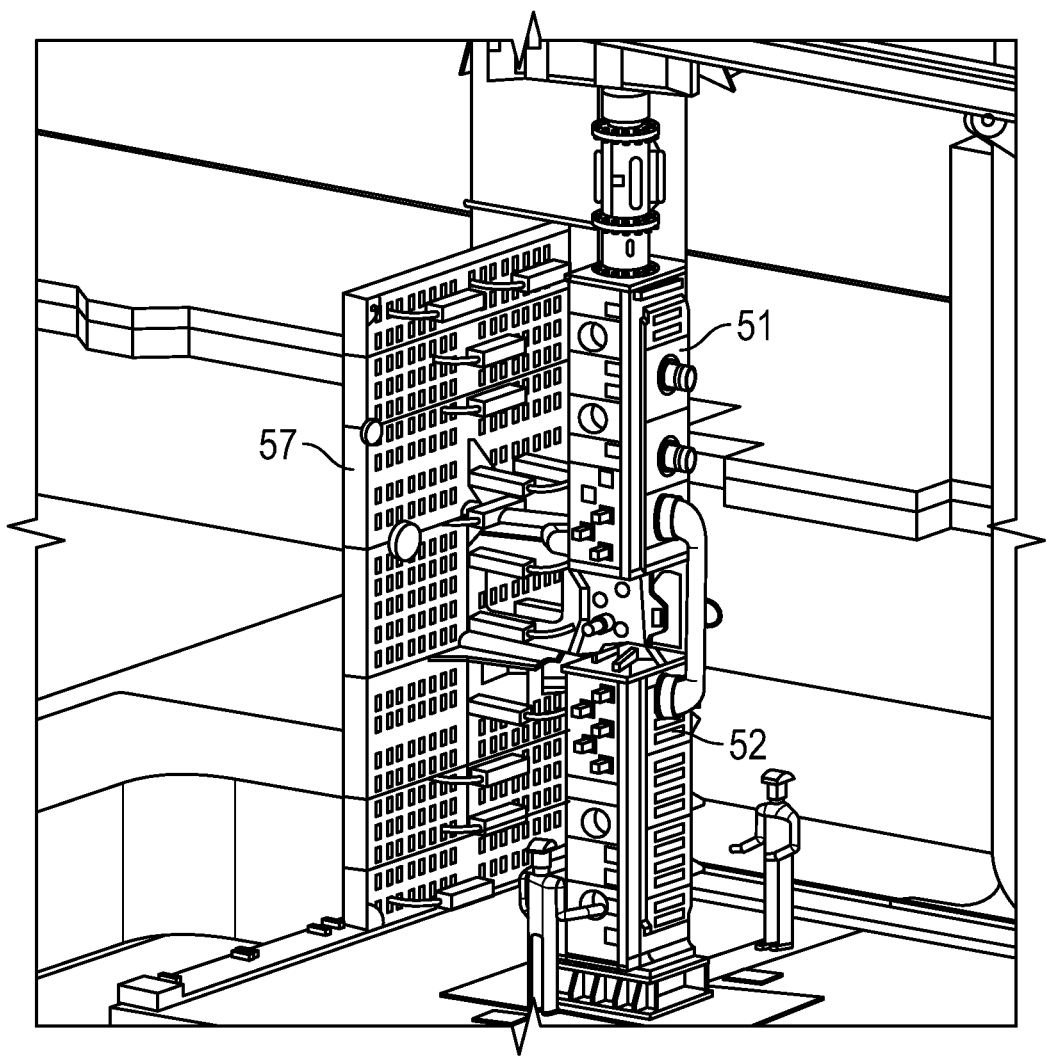

Similarly, the assembly of the SDA (50) follows the subsequent steps, illustrated by FIG. 35-42:

a) As can be seen in FIGS. 36A and 36B, block (52) is transported from the spool using the gutter (81), tensioners (82) and the crane (83) of the vessel (85), wherein said block (52) is transported to the hang-off collar (96) of the vessel (85); said block (43) being connected to the umbilical cable (35);

b) Subsequently, as can be seen in FIG. 35, block (51) is transported through the gutter (81) and tensioners (82) and lifted using the crane (83) of the PLS (93), the umbilical cable (36) that is connected to the block (51) is supported by the moon pool tugger winches (97) and the Chinese fingers (98);

c) The connection between blocks (52) and (54) is made in such a way that the male connector (55) of the block (51) is connected to the female connector (56) of the block (52), as can be seen in FIGS. 36-38, subsequently all electrical and hydraulic connections between blocks (51) and (52) are made;

d) After the connection made in the previous step, the foundation (57) is lifted by the crane (83) and trolley (84) of the PLS (93). After the verticalization and stabilization of the foundation (57), the crane (83) of the PLS (93) and the trolley of the PLS (93) (684 travels to the moon pool center) are removed. As can be seen in FIGS. 39A, 30B, 40A, 40B;

e) the foundation (57) is connected to the SUDs (51) and (52), at that moment, the trolley (84) of the PLS (93) releases the foundation (57), then the Electrical Flying Leads are installed in the SDA (50), as can be seen in FIGS. 41A and 41B.

Installation

Figure 43B:
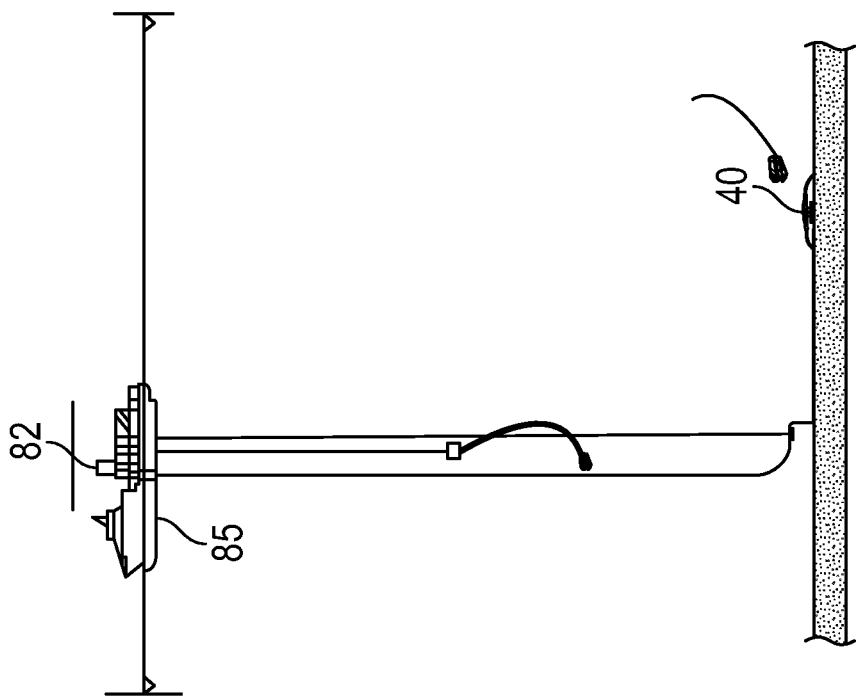
FIGS. 43A and 43B—Schematic of the SDA installation using a crane according to the present invention.
Figure 43A:
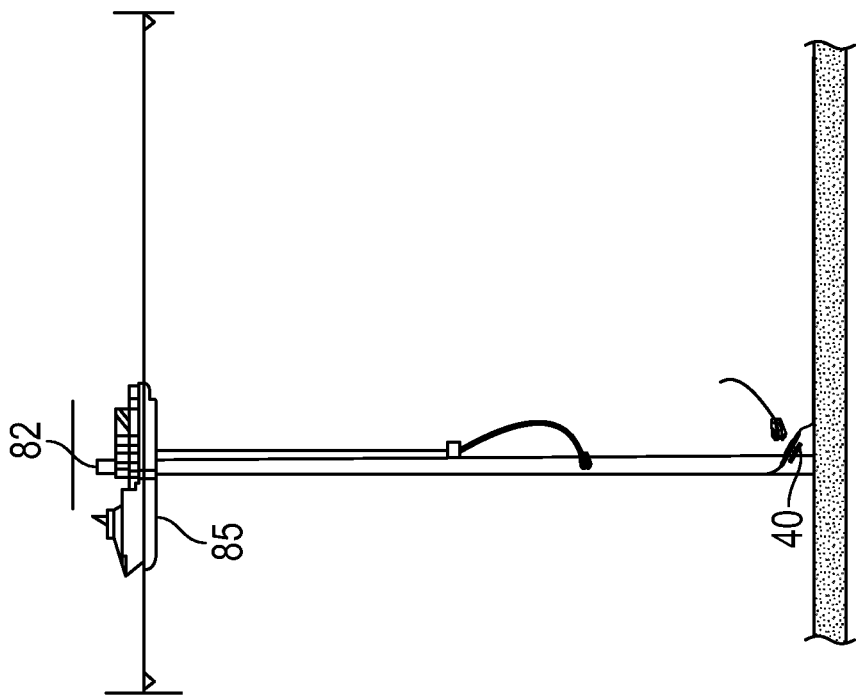

After assembling the SDA (40) and (50), the installation can be done in two ways, using the crane (83) of the vessel (85) or using a buoy (95). In the case of the crane (83) of the vessel (85), the SDA (40 or 50) is lifted by the Snatch block's Master Link and launched overboard. Since the SDA (40 or 50) is launched vertically, the vessel (85) remains motionless so that the SDA (40 and 50) moves in a horizontal direction. After the SDA (40 and 50) reach the seabed, the cables of the crane (83) are removed. The process is illustrated by FIGS. 43A and 43B.

Figure 44B:
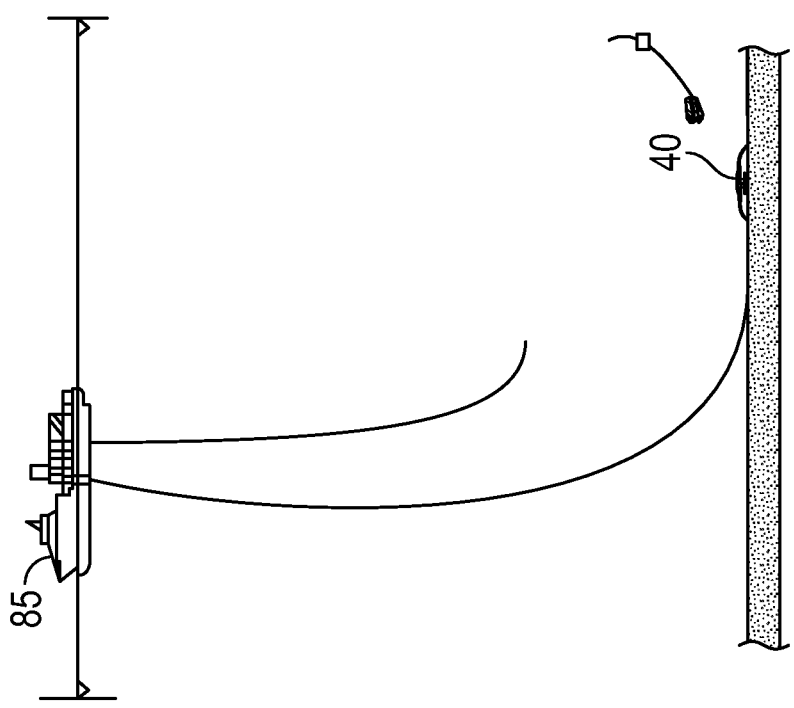
FIGS. 44A and 44B—Schematic view of the installation of the equipment using a buoy according to the present invention.
Figure 44A:
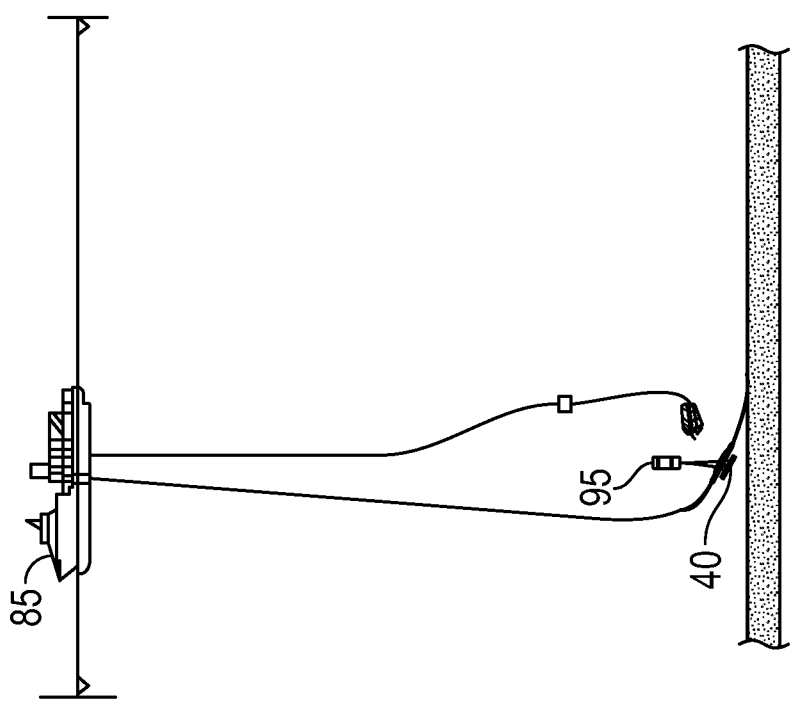

In the case of the installation with the buoy (95), the SDA (40 and 50) has on its upper surface a buoy (95) to slow down the lowering of the equipment to the seabed. Due to the fact that the SDA (40 and 50) are launched vertically, the vessel (85) moves so that the equipment (40, 50) when moving downwards, gradually changes its direction to horizontal direction. After the equipment (40, 50) arrives at the seabed, the buoy (95) is removed. The process is illustrated by FIGS. 44A and 44B.

Furthermore, after the SDA (40), reaches the seabed, the process of replacing the temporary UTAJ (46) with a permanent UTAJ (48) takes place. As can be seen in FIG. 45, after step (I), in which the SDA (40) lies on the seabed, the temporary UTAJ (46) is removed (step (II)). After removing said UTAJ (46), the gasket (90) is removed (step (III)) consists of removing. As we can see in the following steps (IV) and (V), permanent UTAJ (48) is installed.

Figure 1:
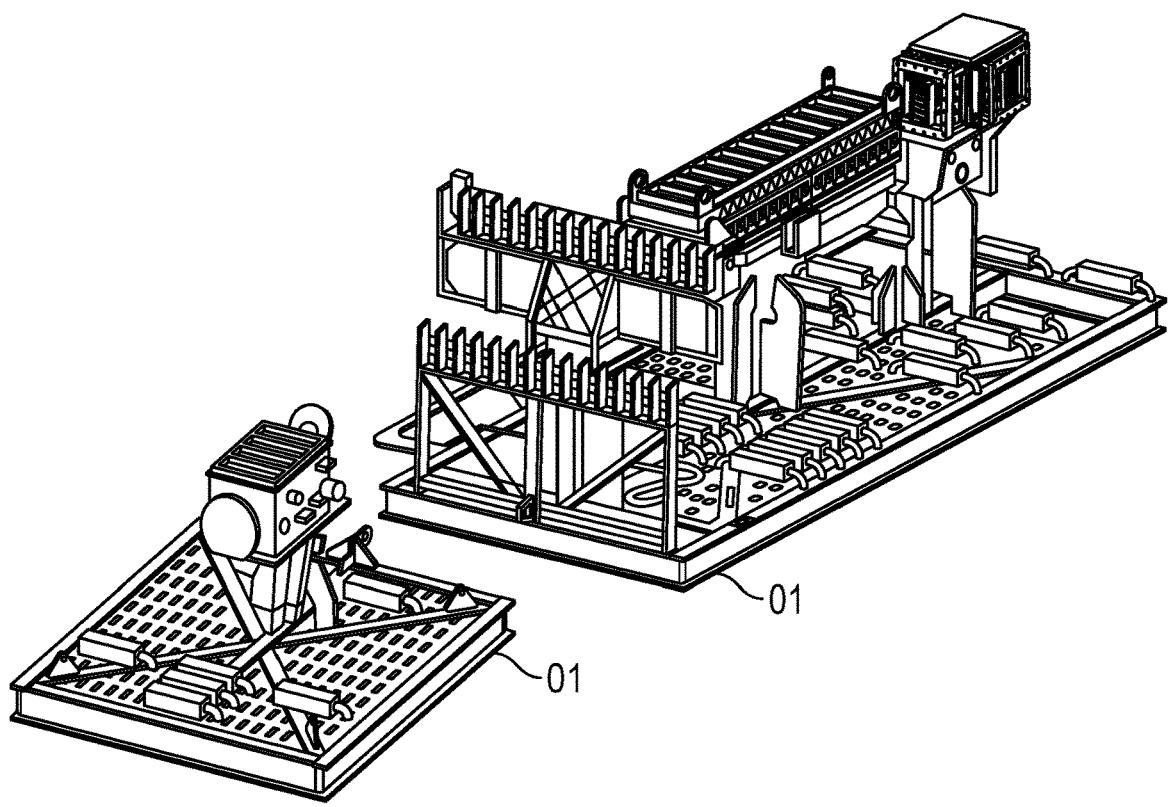
FIG. 1—Perspective view of the SDA of the state of the art.

Additionally, the installation of the SDA (40 and 50) of the present invention occurs in a more efficient way in relation to SDA (state of the art) (01), FIG. 1, since the SDA (01) comprises a foundation (09), SUT (02), SDAJ (03), LC (05), HDU (06), EDU (07). For the installation of the SDA (01), the stop and go process is used, which consists of the installation of each component of the SDA (01) individually on the seabed, which demands time and a higher installation cost. For the installation of the SDA (01), it will be initially necessary to install the foundation (09), and later, the installation of the SUT (02), SDAJ (03), LC (05), HDU (06), EDU (07), and finally, the connection of the components, as can be seen in FIG. 1. Since the present invention is mounted on the vessel (85), it is not necessary to install components separately in the marine environment.

SUT Recovery and Reinstallation

Figure 46:
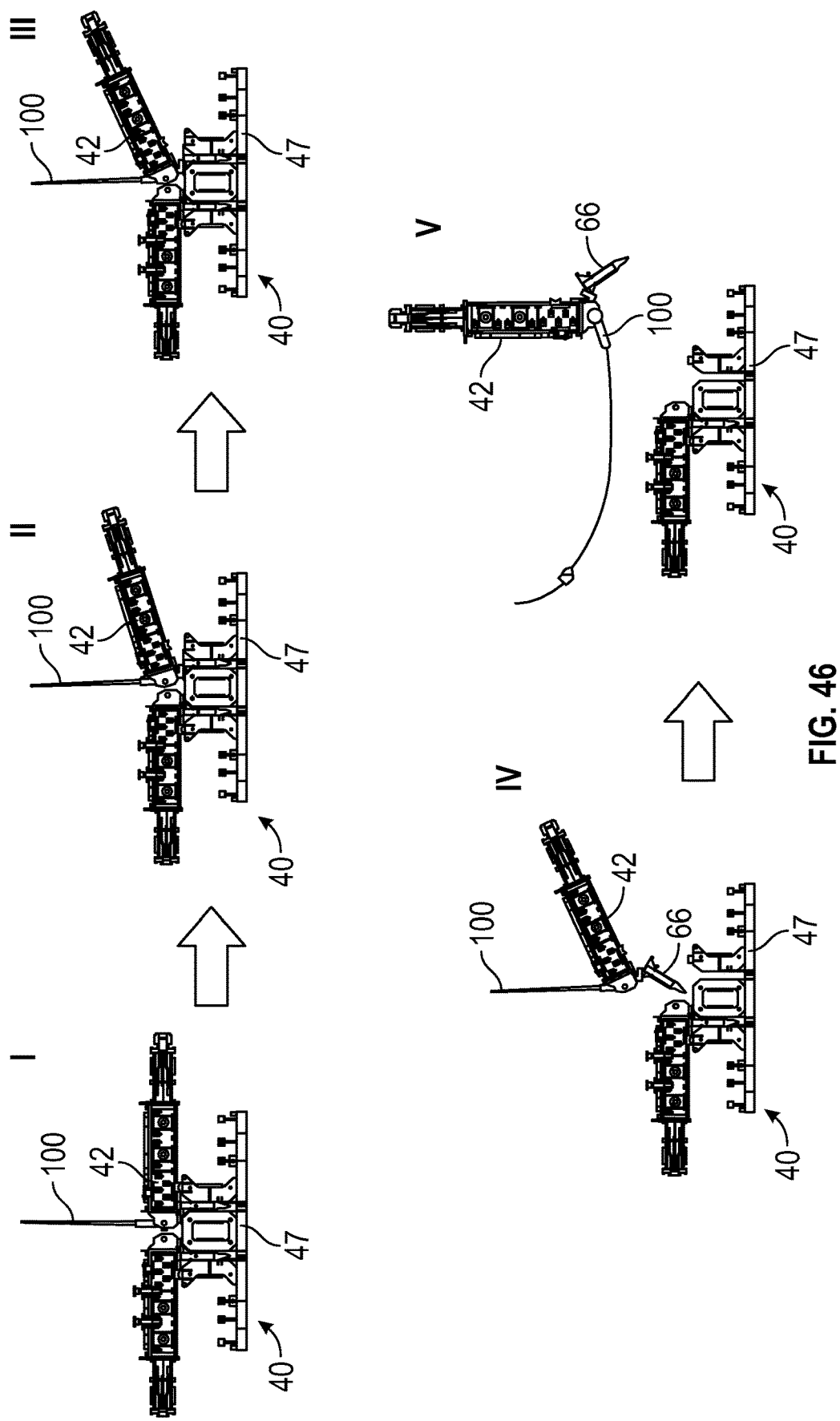
FIG. 46—Removal sequence of a block for repairing the SDA in line with eye joint according to the present invention.

In case of any problem due to hydraulic or electrical failure, the present invention presents a method of recovering and reinstalling the blocks (42) and/or (43), wherein the recovery method, in an exemplary embodiment of recovery, comprises the following steps I-IV, illustrated by FIG. 46:

a) In step I, after removing the UTAJ (46), the recovery tool (100) is installed in the block (42) and unlocks the foundation (47);

b) In step II, the pin (66) of the block (42) is unlocked;

c) In step III, the block (42) is lifted using the umbilical (36) and/or the crane (83) of the vessel;

d) In step IV, the block (42) rotates;

e) In step V, the hook of the crane (83) is disconnected and the elevation to the surface takes place.

Figure 47:
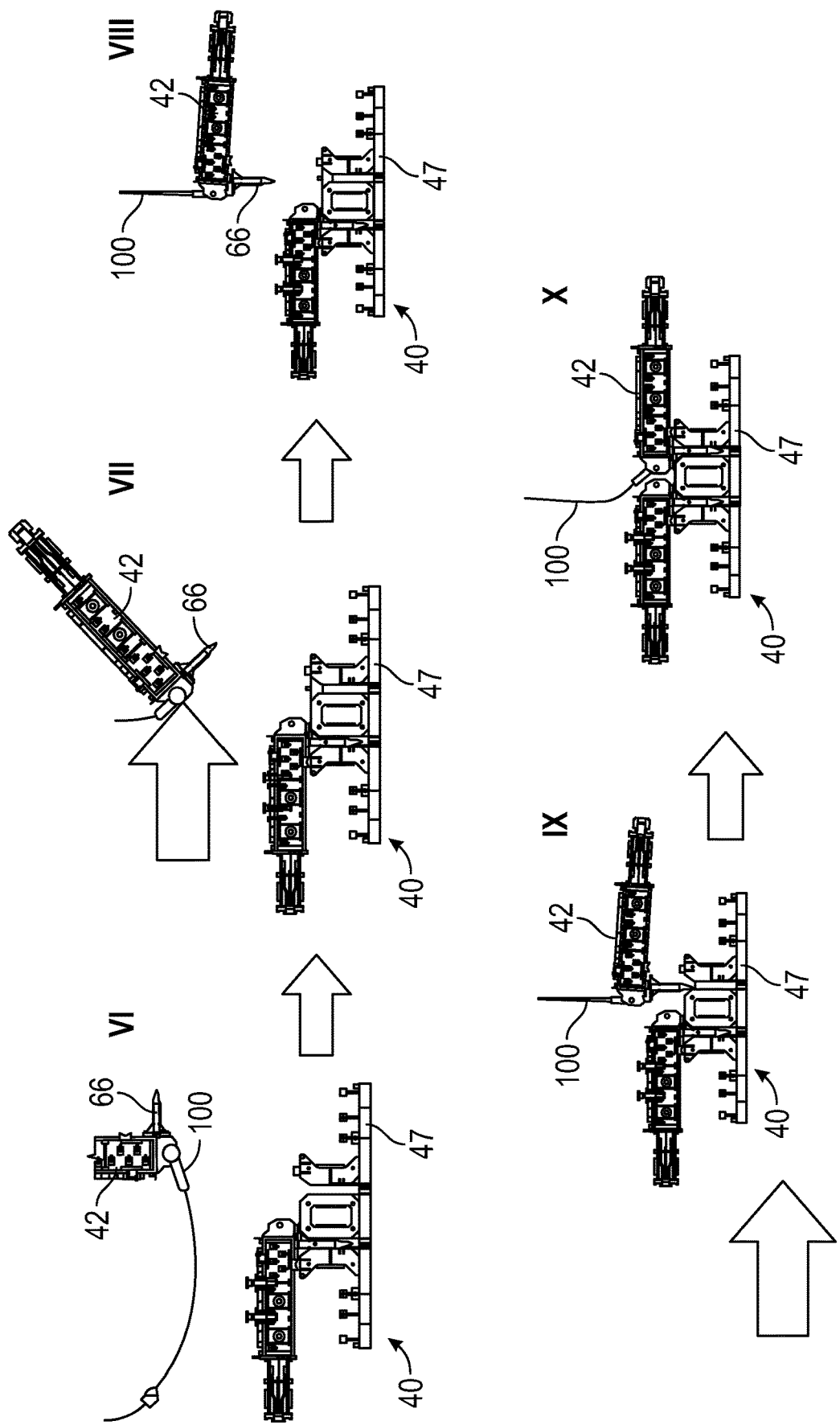
FIG. 47—Installation sequence of a block for repairing the SDA in line with eye joint according to the present invention.

After removing the block (42), the procedure for reinstalling the block (42) already recovered or even the installation of a new block (42) is performed, illustrated in FIG. 47, wherein the method comprises the following VI-X steps:

a) In step VI, the recovered block (42) moves downwards, wherein the recovery tool (100) is connected to the eye of the block (42); the foundation, in step VII, the block (42) rotates;

b) In step VIII, the position of the block (42) and the ROV (not shown) are checked in relation to the foundation (47), after said checking, the pin (66) is housed in the funnel (67) of the foundation (47);

c) In step IX, payment of the crane cable and the umbilical cable (36) is performed;

d) In step X, the pin (66) is locked and the recovery tool (100) is unlocked.

Figure 2:
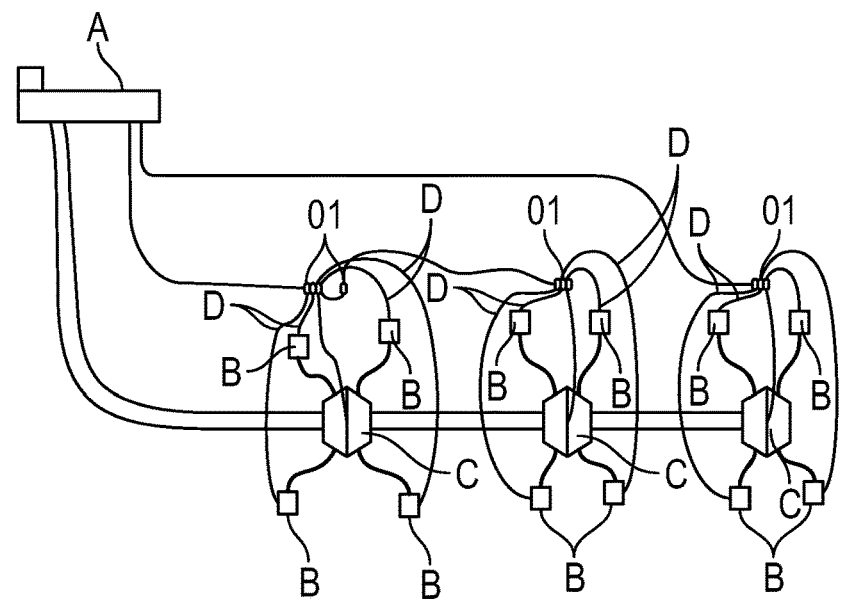
FIG. 2—Schematic of a subsea installation of the state of the art.
Figure 3:
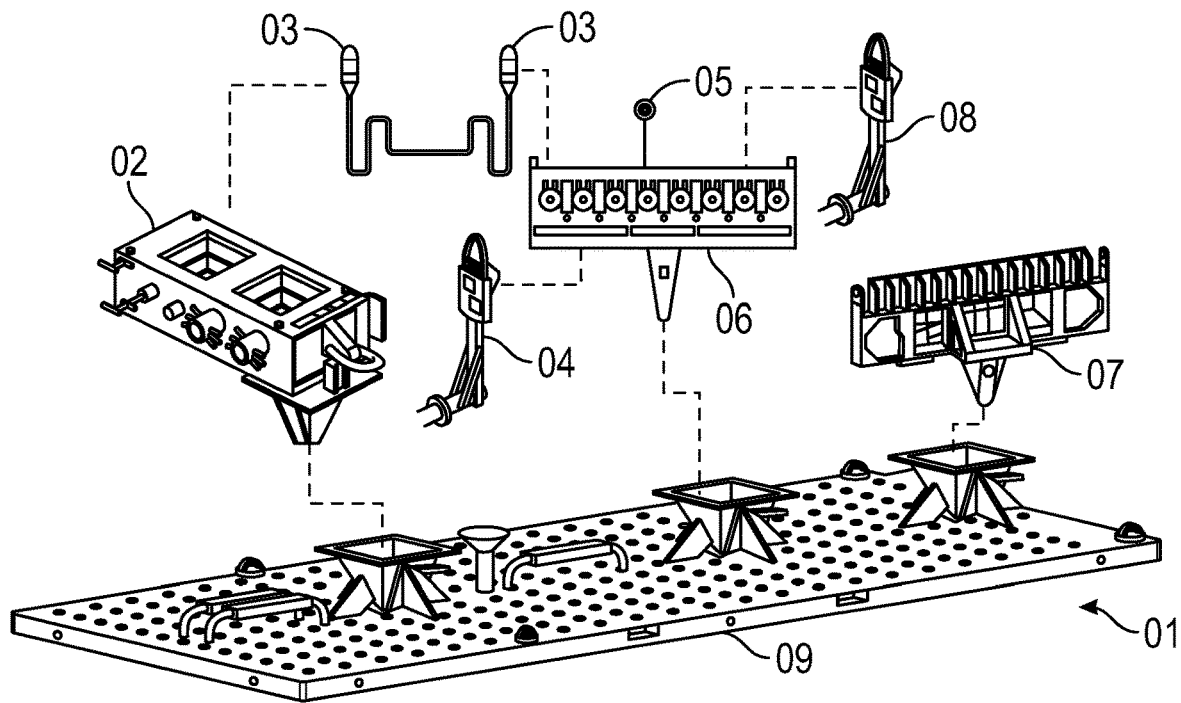
FIG. 3—Perspective view of the SDA components of the state of the art.
Figure 48:
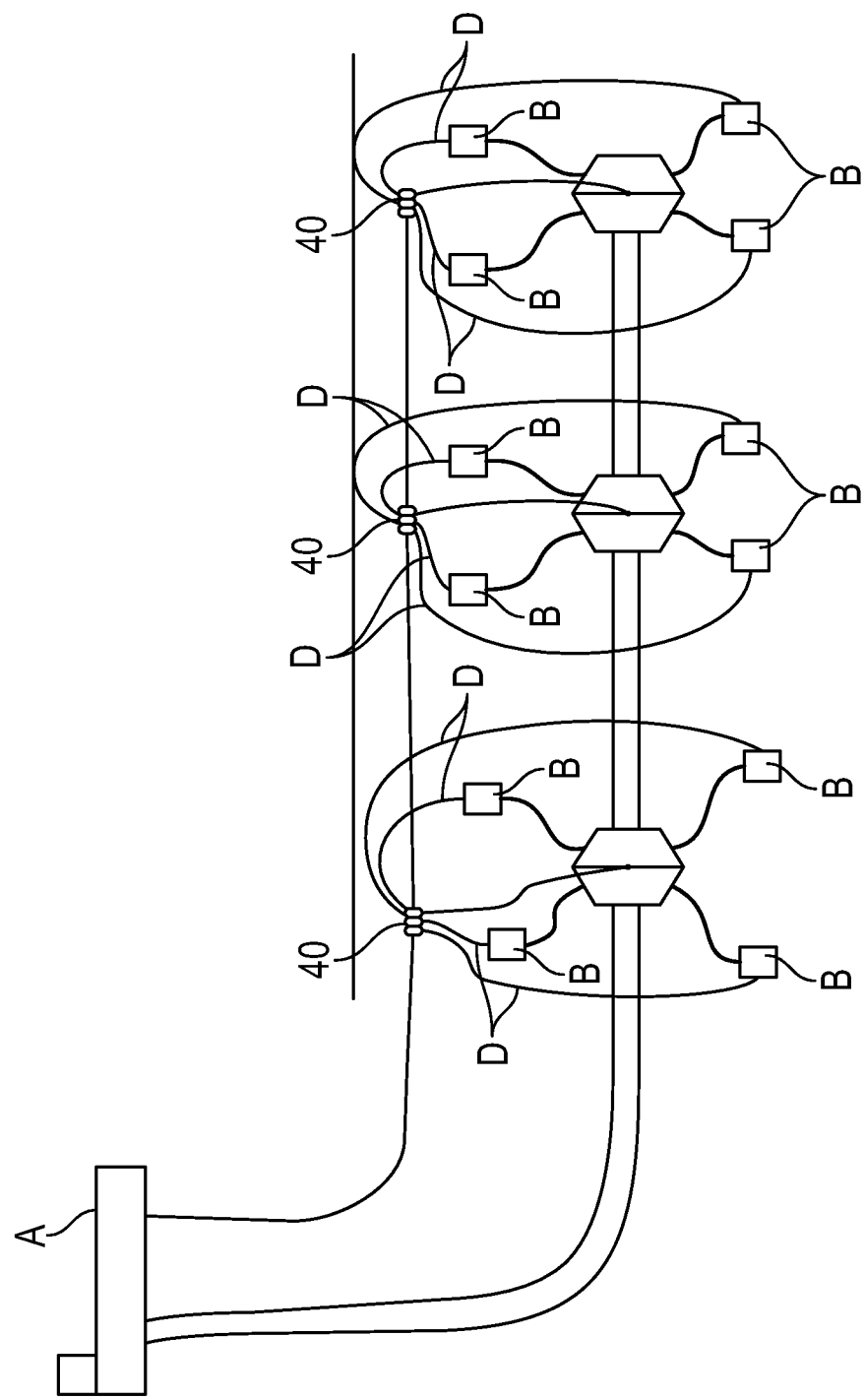
FIG. 48—Schematic of a subsea installation according to the present invention.

The present invention allows a simplification of the subsea field configuration, illustrated by FIG. 2. As can be seen in FIG. 48, the SDA (40) is used to connect the topside (A) to the subsea equipment, Christmas trees (B) and manifold (C), the SDA (40) is connected by electrical and/or hydraulic jumper (D). This configuration provides a reduction in umbilicals when compared to the configuration of the art illustrated by FIG. 2.

Among the numerous advantages that the modularization of subsea systems, object of the present invention, provides, those skilled in the art have noted the:

reduction of design and manufacturing costs;
reduction of the weight and size of the final structure;
ease in transport the final structure;
reduction of the number of parts of the structure; and
reduction of the amount of welding that the structure requires.

The invention claimed is:

1. Modular subsea equipment, comprising:
   a structure comprising a metallic structure, wherein the metallic structure includes panels on lateral, lower and upper surfaces of the metallic structure and the structure further comprises at one end a panel, said end panel having a hole for installing an umbilical connector;
   a pipe mat located inside the structure, wherein the pipe mat comprises parallel pipes, wherein the parallel pipes have connectors, in which said connectors connect to pipes of multi-quick connectors (MQCs) and logic caps that are located on a surface of the structure; and
   an electrical control of an electrical instrumentation is modularized inside the structure, and which has boxes with electrical connections, known as QUADs and comprising junction boxes, electrical connectors and Field Assembled Cable Terminations (FACTs), wherein the electrical connectors connect to inlet and outlet umbilicals.

2. The modular subsea equipment according to claim 1, wherein the structure further comprises an eye or a flange gasket.

3. The modular subsea equipment according to claim 1, wherein one of the panels has a hole.

4. A subsea distribution equipment comprising a modular equipment as described in claim 1, comprising a first block and a second block, wherein the first block has, at a first end, a first subsea termination interface (STI) which is connected to a first umbilical cable, and the second block has, at a second end, a second STI which is connected to a second umbilical cable, said first and second blocks are connected by an umbilical termination assembly jumper (UTAJ); wherein said first and second blocks each have a pin on a lower portion of each of the first and second blocks, the subsea distribution equipment further comprising a foundation, said foundation comprising a funnel.

5. A subsea distribution equipment comprising a modular equipment as described in claim 1, comprising a first block and a second block, wherein block has, at a first end, a first STI which is connected to a first umbilical cable, and the second block has, at a second end, a second STI which is connected to a second umbilical cable, the first block comprises, at an end opposite the first STI, a female connector and the second block comprises a male connector, wherein said first and second blocks are connected by the female connector and the male connector, said first and second blocks are connected to a foundation by screwed gaskets.

6. A method of assembling a subsea distribution equipment assembly, the subsea distribution equipment assembly having modular equipment including a first block and a second block, wherein the first block has, at a first end, a first subsea termination interface (STI) which is connected to a first umbilical cable, and the second block has, at a second end, a second STI which is connected to a second umbilical cable, said first and second blocks are connected by an umbilical termination assembly jumper (UTAJ); wherein said first and second blocks each have a pin on a lower portion of each of the first and second blocks, the subsea distribution equipment assembly further comprising a foundation, said foundation comprising a funnel, wherein assembly of the equipment is performed on a deck of a vessel, the method comprising the following steps:
a) transporting the second block from a spool using a gutter, tensioners and a crane of the vessel, wherein said second block is transported to a hang-off collar of the vessel; said second block being connected to the first umbilical cable;
b) after the second block arrives at the hang-off collar, transporting the first block and then installing an eye joint, and transporting the first block;
c) the eye joint being installed, eyes of the first and second blocks are aligned and brought together so that the eyes are connected through the eye joint;
d) installing the foundation, wherein the foundation is lifted by the crane and trolley of a position location system (PLS); after verticalization and stabilization of the foundation, a crane cable is disconnected; then the crane and trolley move to a moon pool center;
e) connecting the foundation to the first and second blocks, wherein the foundation has a pin and the first and second blocks have, on the lower portion, a connector to connect to the pin; and the foundation further comprising gaskets to be fastened by screws after connecting the trolley; and
f) then installing a temporary UTAJ between the first and second blocks.

7. A method of assembling a subsea distribution equipment assembly, the subsea distribution equipment assembly having modular equipment including a first block and a second block, wherein the first block has, at a first end, a first STI which is connected to a first umbilical cable, and the second block has, at a second end, a second STI which is connected to a second umbilical cable, the first block comprises, at an end opposite the first STI, a female connector and the second block comprises a male connector, wherein said first and second blocks are connected by the female connector and the male connector, said first and second blocks are connected to a foundation by screwed gaskets wherein assembly of the modular equipment is performed on a deck of a vessel, the method comprising the following steps:
a) transporting the second block from a spool using a gutter, tensioners and a crane, wherein said second block is transported to a hang-off collar of the vessel; said second block being connected to the first umbilical cable;
b) transporting the first block through the gutter and the tensioners and lifting using the crane of a position location system (PLS), the second umbilical cable that is connected to the first block being supported by moon pool tugger winches and Chinese fingers;
c) performing the connection of the first and second blocks in such a way that the male connector of the first block is connected to the female connector (56) of the second block, then performing all electrical and hydraulic connections between the first and second blocks;
d) after the connection made in previous step (c), the foundation is lifted by the crane and a trolley of the PLS, after verticalization and stabilization of the foundation, the crane and the trolley of the PLS move to a moon pool center; and
e) connecting the foundation to the first and second blocks, and at that moment, the trolley of the PLS releases the foundation, then the electrical flying leads are installed in the subsea distribution equipment assembly.

* * * * *